US010706657B2

(12) United States Patent
Okuma et al.

(10) Patent No.: US 10,706,657 B2
(45) Date of Patent: Jul. 7, 2020

(54) MANAGEMENT APPARATUS FOR MANAGING AN AUTOMATIC CHANGE MACHINE AND RECEIPT PRINTER, AND METHOD OF MANAGING THE SAME

(71) Applicant: TOSHIBA TEC KABUSHIKI KAISHA, Tokyo (JP)

(72) Inventors: Yumiko Okuma, Nakano Tokyo (JP); Tsuyoshi Gotanda, Ota Tokyo (JP); Mayuko Tsunoda, Yokohama Kanagawa (JP); Jun Kikuchi, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 16/107,298

(22) Filed: Aug. 21, 2018

(65) Prior Publication Data

US 2019/0066429 A1 Feb. 28, 2019

(30) Foreign Application Priority Data

Aug. 25, 2017 (JP) ................................ 2017-162452

(51) Int. Cl.

| | |
|---|---|
| ***G07D 11/00*** | (2019.01) |
| ***G06Q 40/00*** | (2012.01) |
| ***G07F 19/00*** | (2006.01) |
| ***G07D 11/245*** | (2019.01) |
| ***G07D 11/34*** | (2019.01) |

(Continued)

(52) U.S. Cl.
CPC ......... *G07D 11/245* (2019.01); *G07D 11/009* (2013.01); *G07D 11/235* (2019.01); *G07D 11/34* (2019.01); *G07D 11/50* (2019.01)

(58) Field of Classification Search
USPC .................................................. 235/379, 383
See application file for complete search history.

(56) References Cited

U.S. PATENT DOCUMENTS 5,302,811 A * 4/1994 Fukatsu .................. G07D 9/00 235/380
5,813,510 A * 9/1998 Rademacher ........... G07D 1/04 194/206

(Continued)

*Primary Examiner* — Tuyen K Vo
(74) *Attorney, Agent, or Firm* — Kim & Stewart LLP

(57) ABSTRACT

A management apparatus according to an embodiment includes an interface for communicating with an automatic change machine in a store. The automatic change machine receives money and provides withdrawal of money. A storage device stores first statistical information indicating a number of customers in the store during past time periods, and second statistical information indicating an amount of money stored in the automatic change machine during past time periods. A processor is programmed to perform a prediction processing including: predicting, based on the first statistical information and the second statistical information, at least one of an appropriate collection time period during a current day for collecting money from the automatic change machine and an appropriate refill time period for refilling money in the automatic change machine, and outputting information for displaying an image indicating the at least one of the predicted collection time period and the predicted refill time period.

14 Claims, 15 Drawing Sheets

(51) Int. Cl.

| | |
|---|---|
| ***G07D 11/50*** | (2019.01) |
| ***G07D 11/235*** | (2019.01) |

(56) References Cited

U.S. PATENT DOCUMENTS

| | | | | |
|---|---|---|---|---|
| 2004/0231955 | A1* | 11/2004 | Carter | G07D 9/00 194/217 |
| 2010/0230231 | A1* | 9/2010 | Uesaka | G07D 9/02 194/206 |
| 2013/0215055 | A1 | 8/2013 | Okuma et al. | |
| 2014/0110219 | A1* | 4/2014 | Higashiyama | G07G 1/12 194/216 |
| 2014/0290539 | A1* | 10/2014 | Tagashira | G07G 1/14 109/53 |
| 2017/0256142 | A1* | 9/2017 | Oe | G07F 17/42 |

* cited by examiner

MANAGEMENT APPARATUS FOR MANAGING AN AUTOMATIC CHANGE MACHINE AND RECEIPT PRINTER, AND METHOD OF MANAGING THE SAME

CROSS-REFERENCE TO RELATED APPLICATION

This application is based upon and claims the benefit of priority from Japanese Patent Application No. 2017-162452, filed in Aug. 25, 2017, the entire contents of which are incorporated herein by reference.

FIELD

Embodiments described herein relate generally to a management apparatus for managing an automatic change machine and receipt printer, and a method of managing the same.

BACKGROUND

In the related art, a point of sales (POS) system is introduced in a store such as a supermarket or a convenience store to process sales of commodities purchased by customers and to manage sales data of the store.

The POS system includes one or a plurality of POS terminals and a server such as a store server. Each POS terminal performs sales registration and payment processing for commodities purchased by customers. The server receives and stores sales data from the one or the plurality of POS terminals and manages the sales data of the store.

A coin change machine and a bill change machine (hereinafter, collectively referred to as an "automatic change machine") that are used for deposit and withdrawal of bills and coins (hereinafter, collectively referred to as "money") are connected to each POS terminal. Money that is received from customers is deposited and stored in each automatic change machine. Change that is to be given to customers is withdrawn from each automatic change machine.

Each POS terminal issues receipts to be given to customers. Commodity information related to commodities purchased by customers, payment information related to payment, and the like are printed on the receipts. A roll of receipt paper is stored in each POS terminal, and the receipts are issued by printing the commodity information, the payment information, and the like on the receipt paper.

Money needs to be collected from each automatic change machine filled with money. Also, each automatic change machine having not enough money needs to be refilled with money. In addition, if the receipt paper becomes insufficient by issuing the receipts, the receipt paper needs to be replaced with new receipt paper.

If refill or collection of money in an automatic change machine or replacement of receipt paper is performed, operations with respect to the corresponding POS terminal or automatic change machine needs to be stopped. Thus, when the store is congested, refill or collection of money in each automatic change machine or replacement of receipt paper in each POS terminal causes customers performing payment to wait.

DETAILED DESCRIPTION

Embodiments provide a management apparatus and a method that enable prediction of an appropriate time period for money refill or an appropriate time period for money collection, or an appropriate time period for replacing receipt paper in which the number of customers is relatively small.

An automatic change machine management apparatus according to an embodiment includes an interface for communicating with an automatic change machine in a store. The automatic change machine receives money and provides withdrawal of money. A storage device stores first statistical information indicating a number of customers in the store during past time periods, and second statistical information indicating an amount of money stored in the automatic change machine during past time periods. A processor is programmed to perform a prediction processing including: predicting, based on the first statistical information and the second statistical information, at least one of an appropriate collection time period during a current day for collecting money from the automatic change machine and an appropriate refill time period for refilling money in the automatic change machine, and outputting information for displaying an image indicating the at least one of the predicted collection time period and the predicted refill time period.

Hereinafter, an embodiment will be described in detail with reference to the drawings. In the embodiment, a server will be described as one example of a management apparatus. The embodiment described below is not for limitation.

Figure 1:
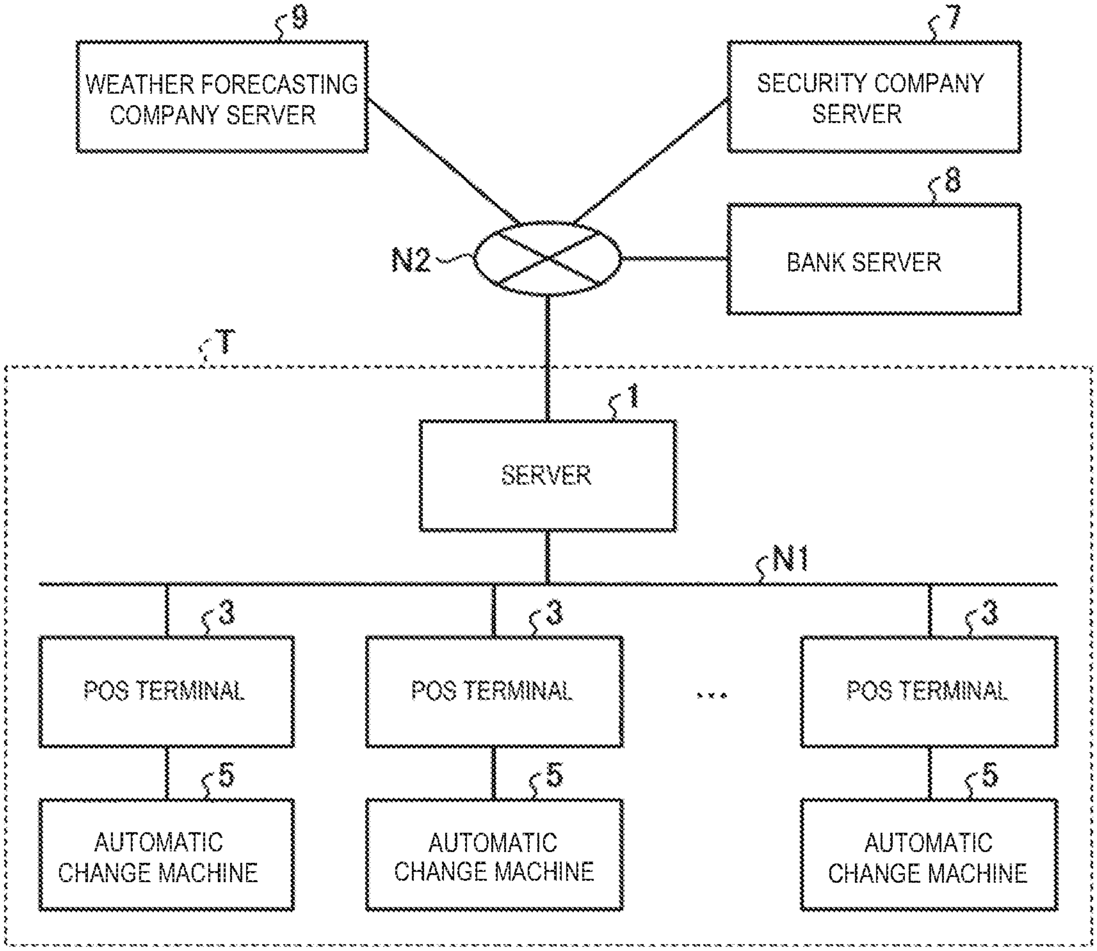
FIG. 1 is a schematic diagram illustrating a POS system according to an embodiment.

FIG. 1 is a schematic diagram illustrating a POS system according to the embodiment. The POS system includes a server 1, a plurality of POS terminals 3, and an automatic change machine 5 connected to each POS terminal 3 in a store T. In this case, the automatic change machine 5 is indirectly connected to the server 1.

Each POS terminal 3 is connected to the server 1 through a communication line N1 such as a local area network (LAN). Thus, the server 1 and the POS terminal 3 can transmit and receive data and the like with each other.

The POS terminal 3 executes sales registration and payment processing for commodities that are sold in the store T. The sales registration refers to a process of acquiring a commodity code by capturing or optically reading a symbol or an image of a symbol such as a barcode assigned to a sold commodity, displaying commodity information (a commodity name, a price, and the like) related to the commodity read from a commodity master based on the acquired commodity code, and storing the commodity information in a RAM or the like. The payment processing refers to, for example, a process of displaying the total amount of money related to a transaction based on the commodity information stored in the RAM or the like during the sales registration, and calculating and displaying the amount of change based on money (cash) received from a customer.

The POS terminal 3 transmits information regarding the calculated amount of change to the automatic change machine 5. The POS terminal 3 also outputs the commodity information and the payment information to a receipt issuing device. The receipt issuing device issues a receipt on which the input commodity information and payment information are printed. If the receipt issuing device is incorporated in the POS terminal 3, the receipt issuing device functions as a printing device 40 (refer to FIG. 5) which will be described later. The receipt issuing device may be a printing device that is electrically connected to the POS terminal 3. In the embodiment, the printing device 40 will be described as the receipt issuing device below. The POS terminal 3 also transmits the commodity information and the payment information to the server 1 through the communication line N1.

The server 1 tracks and manages sales data from the store T based on the commodity information and the payment information received from each POS terminal 3. The server predicts a time period for refilling money in the automatic change machine 5 and a time period for collecting money from the automatic change machine 5. The server 1 also predicts a time period for replacing a roll of receipt paper stored in the POS terminal 3.

The automatic change machine 5 is electrically connected to the POS terminal 3. Thus, the POS terminal 3 and the automatic change machine 5 can transmit and receive data and the like with each other. The automatic change machine 5 has the function of at least one of a coin change machine that is used for deposit and withdrawal of coins, and a bill change machine that is used for deposit and withdrawal of bills. The embodiment will be described using the automatic change machine 5 that has the function of both deposit and withdrawal of coins, and deposit and withdrawal of bills.

The automatic change machine 5 includes a coin deposit unit, a coin withdrawal unit, a bill deposit unit, and a bill withdrawal unit (none illustrated). The coin deposit unit is used for deposit of coins from the customer into the automatic change machine 5. The coin withdrawal unit is used for withdrawal of coins included in money to be paid to the customer as change. The bill deposit unit is used for deposit of bills received from the customer into the automatic change machine 5. The bill withdrawal unit is used for withdrawal of bills included in the money to be paid to the customer as change.

The automatic change machine 5 includes a storage unit in which coins deposited from the coin deposit unit and bills deposited from the bill deposit unit are stored by type. If change information is input from the POS terminal 3, the automatic change machine 5 withdraws money corresponding to the amount of change from money stored in the storage unit. If the withdrawn money includes coins, the coins are withdrawn from the coin withdrawal unit. If the withdrawn money includes bills, the bills are withdrawn from the bill withdrawal unit.

The server 1 can communicate with a server 7 installed in a security company through a communication line N2 such as an Internet line. Thus, the server 1 and the server 7 in the security company can transmit and receive data and the like with each other. The server 1 can also communicate with a server 8 installed in a bank through the communication line N2. Thus, the server 1 and the server 8 in the bank can transmit and receive data and the like with each other.

A company that operates the store T outsources, to the security company, work such as transporting money to be used for change to a safe in the store T from the bank, or transporting collected sales money to the bank. The money for change is prepared as change in the automatic change machine 5. The store T communicates information related to money between the server 1 and the server 7 and the server in order to request the security company to prepare sufficient money for change or to transport collected money for deposit in the bank promptly.

The server 1 can also communicate with a server 9 installed in a weather forecasting company through the communication line N2. Thus, the server 1 and the server 9 in the weather forecasting company can transmit and receive data and the like with each other. The server 1 continuously or periodically receives meteorological information such as weather, temperature, and humidity from the server 9.

The server 1 estimates the number of customers visiting the store T based on the acquired meteorological information and statistical information (hereinafter referred to as "first statistical information") which will be described later. The server 1 predicts the time period for refiling money in the automatic change machine 5 or the time period for collecting money from the automatic change machine 5 based on the first statistical information and statistical information (hereinafter referred to as "second statistical information") related to the amount of money stored in the automatic change machine 5.

Figure 2:
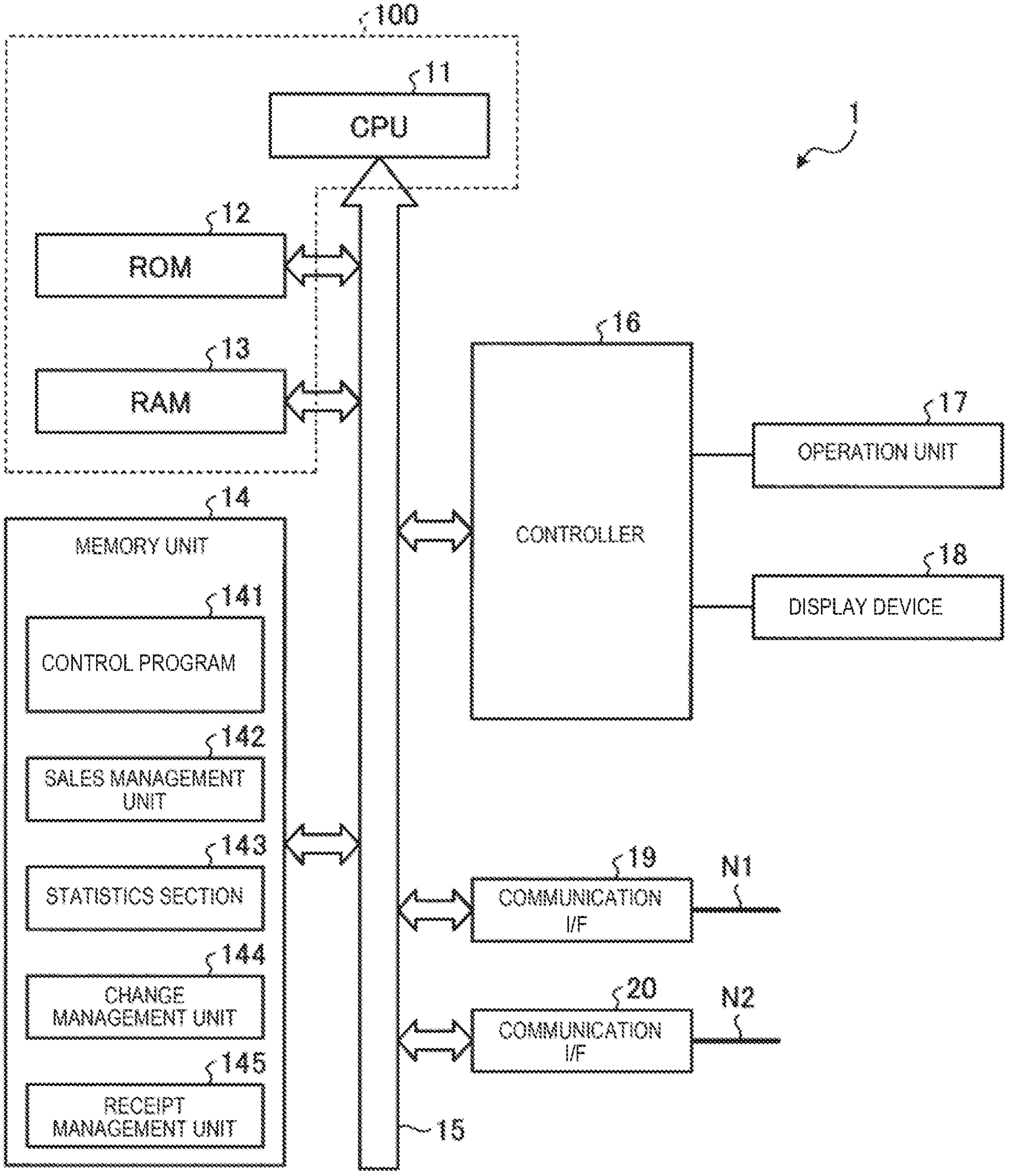
FIG. 2 is a block diagram illustrating a hardware configuration of a server.

Hereinafter, hardware configurations of the server 1 and the POS terminal 3 will be described. First, a hardware configuration of the server 1 will be described. FIG. 2 is a block diagram illustrating a hardware configuration of the server 1. As illustrated in FIG. 2, the server 1 includes a central processing unit (CPU) 11, a read-only memory (ROM) 12, a random access memory (RAM) 13, a memory unit 14, and the like. The CPU 11 is a main controller. The ROM 12 stores various programs. Programs and various types of data are loaded into the RAM 13. The memory unit 14 stores various programs. The CPU 11, the ROM 12, the RAM 13, and the memory unit 14 are connected to each other through a bus 15. The CPU 11, the ROM 12, and the RAM 13 constitute a control unit 100. That is, the control unit 100 executes a control, described later, related to the server 1 by operating the CPU 11 in accordance with a control program that is stored in the ROM 12 or the memory unit 14 and loaded into the RAM 13.

The memory unit 14 is a non-volatile memory device such as a hard disc drive (HDD) or a flash memory that retains stored information even if power is off. The memory unit 14 includes a control program 141, a sales management unit 142, a statistics section 143, a change management unit 144, and a receipt management unit 145. The control program 141 is used for controlling the server 1. The sales management unit 142 stores and manages sales information that is acquired by counting the commodity information and the payment information which are related to commodities purchased by customers and received from each POS terminal 3.

The statistics section 143 stores the first statistical information, the second statistical information, and third statistical information related to the amount of use of the receipt paper. Details of the statistics section 143 will be described later in connection with FIG. 3. For each automatic change machine 5 (that is, for each POS terminal 3), the change management unit 144 stores information related to each type of money stored in the automatic change machine 5 and received from the POS terminal 3.

For each POS terminal 3, the receipt management unit 145 stores information related to the actual amount of use of the receipt paper and received from the POS terminal 3. The amount of use of the receipt paper is calculated based on data such as the number of issued receipts handed to customers, the amount of printing of commercial messages or logos on the receipt paper, the number of issued receipts including sales promotion information, the number of issued receipt copies, the ratio of electronic receipts (i.e., the ratio of receipts not issued as paper receipts compared to total receipts issued), and the number of non-transaction receipts issued (reports and the like at the time of inspection and settlement). The amount of use of the receipt paper can be estimated based on statistical data of the average amount of use of the receipt paper in one instance of issuing the receipt, and the number of sheets of issued receipt paper. The amount of use of the receipt paper can also be estimated by, for example, measuring a distance in which the receipt paper is transported. The distance in which the receipt paper is transported can be measured based on the number of rotations of a transport roller that transports the receipt paper.

The control unit 100 is connected to an operation unit and a display device 18 through the bus 15 and a controller 16. The operation unit 17 is a keyboard. The display device 18 displays information to an operating person who operates the server 1.

The control unit 100 is also connected to a communication interface (I/F) 19 through the bus 15. The communication interface 19 is communicably connected to the plurality of POS terminals 3 through the communication line N1. The control unit 100 is also connected to a communication interface (I/F) 20 through the bus 15. The communication interface 20 is communicably connected to the security company server 7, the bank server 8, and the weather forecasting company server 9 outside the store T through the communication line N2.

Figure 3:
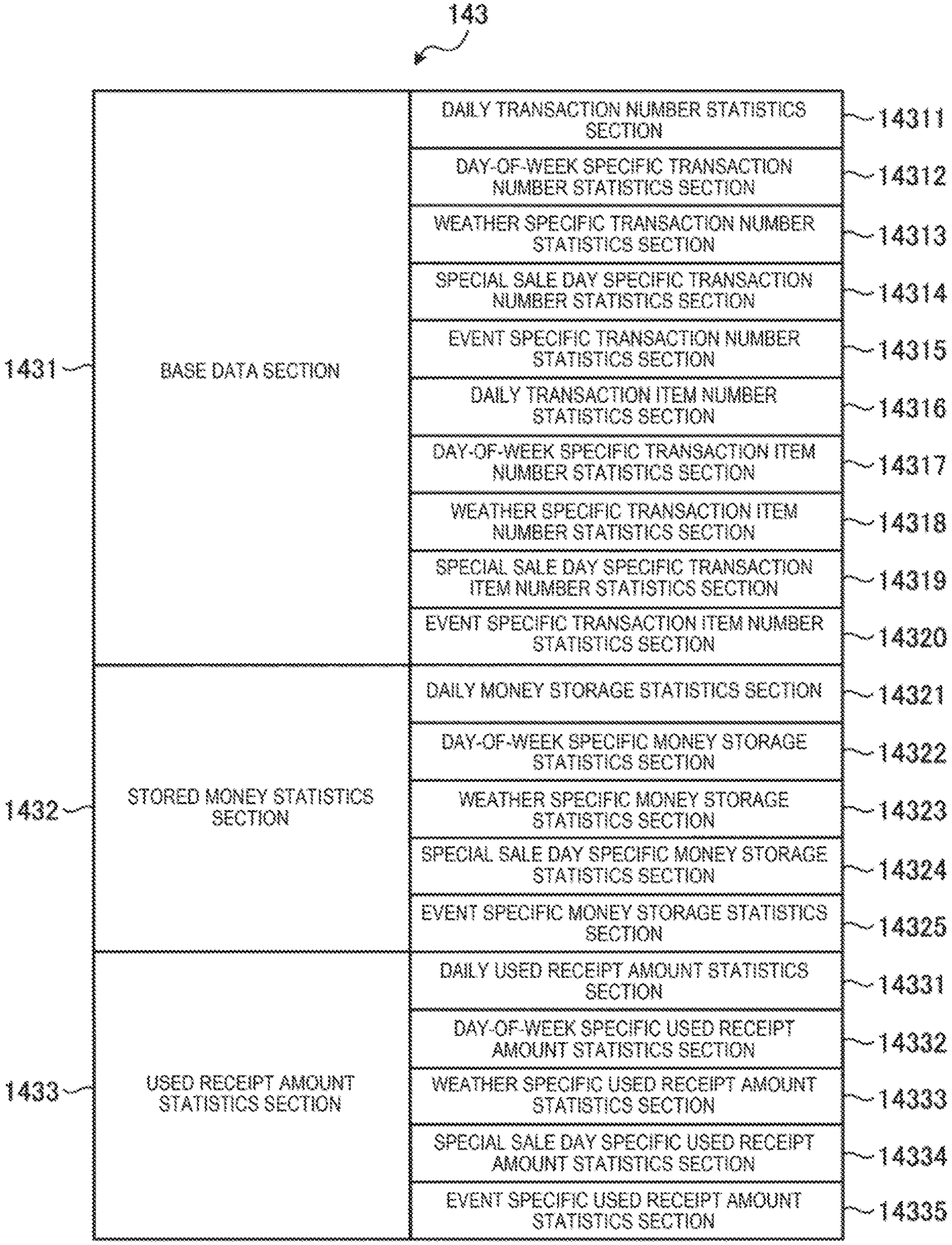
FIG. 3 is a diagram illustrating a memory configuration of a statistics section.

Next, the statistics section 143 will be described. FIG. 3 is a diagram illustrating a memory configuration of the statistics section 143 corresponding to one automatic change machine 5. The statistics section 143 stores, in a base data section 1431, statistical data (first statistical information) that represents the number of customers visiting the store T. The statistics section 143 stores, in a stored money statistics section 1432, statistical data (second statistical information) that represents the number of pieces of each type of money stored in the automatic change machine 5. The statistics section 143 stores, in a used receipt amount statistics section 1433, statistical data (third statistical information) that represents the amount of use of the receipt paper stored in the POS terminal 3 during one day.

The base data section 1431 includes a daily transaction number statistics section 14311, a day-of-week specific transaction number statistics section 14312, a weather specific transaction number statistics section 14313, a special sale day specific transaction number statistics section 14314, an event specific transaction number statistics section 14315, a daily transaction item number statistics section 14316, a day-of-week specific transaction item number statistics section 14317, a weather specific transaction item number statistics section 14318, a special sale day specific transaction item number statistics section 14319, and an event specific transaction item number statistics section 14320.

The daily transaction number statistics section 14311 stores statistical data that represents a daily number of transactions at each time (for example, the number of transactions per hour). With this statistical data, a time range in which the number of transactions is large, and a time range in which the number of transactions is small during one day can be found. In addition, the number of transactions at each time can be found for each day in a predetermined period (for example, the first to the thirtieth (or the thirty-first) of each month). In addition, characteristics (differences) of a daily change in the number of transactions can be found.

The day-of-week specific transaction number statistics section 14312 stores statistical data that represents the number of transactions at each time (for example, the number of transactions per hour) for each day (Sunday to Saturday). With this statistical data, a time range in which the number of transactions is large, and a time range in which the number of transactions is small during one day can be found for each day of the week. In addition, the number of transactions at each time can be found for each day of the week. In addition, differences in the number of transactions can be found for each day of the week compared to other days.

The weather specific transaction number statistics section 14313 stores statistical data that represents the number of transactions at each time (for example, the number of transactions per hour) for each type of weather (sunny, cloudy, rainy, snowy, a day of strong wind, a day of light wind, a day of high humidity, a day of low humidity, and the like). With this statistical data, a time range in which the number of transactions is large, and a time range in which the number of transactions is small during one day can be found for each type of weather. In addition, the number of transactions at each time can be found for each type of weather. In addition, differences in the number of transactions can be found for each type of weather compared to other types of weather.

The special sale day specific transaction number statistics section 14314 stores statistical data that represents the number of transactions at each time (for example, the number of transactions per hour) if the day is a special sale day when a special sale is held. With this statistical data, a time range in which the number of transactions is large, and a time range in which the number of transactions is small during one special sale day can be found. In addition, the number of transactions at each time on a special sale day can be found. In addition, differences in the number of transactions on a special sale day compared to an ordinary day which is not a special sale day can be found.

The event specific transaction number statistics section 14315 stores statistical data that represents the number of transactions at each time (for example, the number of transactions per hour) in the case of holding an event (for example, a morning fair or a limited-time sale) and the case of not holding an event. With this statistical data, a time range in which the number of transactions is large, and a time range in which the number of transactions is small during one day in the case of holding an event and the case of not holding an event can be found. In addition, the number of transactions at each time in the case of holding an event and the case of not holding an event can be found. In addition, differences in the number of transactions in the case of holding an event and the case of not holding an event can be found.

The daily transaction item number statistics section 14316 stores statistical data that represents the number of items in transactions at each time (for example, the number of items in transactions per hour). With this statistical data, a time range in which the number of items in transactions is large, and a time range in which the number of items in transactions is small during one day can be found. In addition, the number of items in transactions at each time can be found for each day in a predetermined period (for example, the first to the thirtieth (or the thirty-first) of each month). In addition, differences in the number of items in transactions for each time compared to other times can be found.

The day-of-week specific transaction item number statistics section 14317 stores statistical data that represents the number of items in transactions at each time (for example, the number of items in transactions per hour) for each day (Sunday to Saturday). With this statistical data, a time range in which the number of items in transactions is large, and a time range in which the number of items in transactions is small during one day can be found for each day of the week. In addition, the number of items in transactions at each time can be found for each day of the week. In addition, differences in the number of items in transactions can be found for each day of the week compared to other days of the week.

The weather specific transaction item number statistics section 14318 stores statistical data that represents the number of items in transactions at each time (for example, the number of items in transactions per hour) for each type of weather (sunny, cloudy, rainy, snowy, strong wind, light wind, high humidity, low humidity, and the like). With this statistical data, a time range in which the number of items in transactions is large, and a time range in which the number of items in transactions is small during one day can be found for each type of weather. In addition, the number of items in transactions at each time can be found for each type of weather. In addition, differences in the number of items in transactions can be found for each type of weather compared to other types of weather.

The special sale day specific transaction item number statistics section 14319 stores statistical data that represents the number of items in transactions at each time (for example, the number of items in transactions per hour) if the day is a special sale day when a special sale is held. With this statistical data, a time range in which the number of items in transactions is large, and a time range in which the number of items in transactions is small during one special sale day can be found. In addition, the number of items in transactions at each time on a special sale day can be found. In addition, differences in the number of items in transactions on a special sale day compared to an ordinary day which is not a special sale day can be found.

The event specific transaction item number statistics section 14320 stores statistical data that represents the number of items in transactions at each time (for example, the number of items in transactions per hour) in the case of holding an event (for example, a morning fair or a limited-time sale) and the case of not holding an event. With this statistical data, a time range in which the number of items in transactions is large, and a time range in which the number of items in transactions is small during one day in the case of holding an event and the case of not holding an event can be found. In addition, the number of items in transactions at each time in the case of holding an event and the case of not holding an event can be found. In addition, differences in the number of items in transactions in the case of holding an event and the case of not holding an event can be found.

The server 1 estimates a change in the number of customers visiting the store T on the current day based on the number of transactions, the number of items in transactions, the year, the month, the date, and the day of the week (for example, the current day) when the number of customers is estimated, the presence of a special sale or an event, and the meteorological information acquired from the weather forecasting company, which are stored in the base data section 1431.

Next, the stored money statistics section 1432 will be described. The stored money statistics section 1432 includes a daily money storage statistics section 14321, a day-of-week specific money storage statistics section 14322, a weather specific money storage statistics section 14323, a special sale day specific money storage statistics section 14324, and an event specific money storage statistics section 14325.

The daily money storage statistics section 14321 stores statistical data that represents the number of pieces of each type of money (for example, the number of pieces of each type of money per hour) stored in the automatic change machine 5 at each time. With this statistical data, a time range in which the amount of each type of stored money is large, and a time range in which the amount of each type of stored money is small in the automatic change machine 5 during one day can be found. In addition, the amount of each type of money stored in the automatic change machine 5 at each time can be found for each day in a predetermined period (for example, the first to the thirtieth (or the thirty-first) of each month). In addition, differences in each type of stored money for each time compared to other times can be found.

The day-of-week specific money storage statistics section 14322 stores statistical data that represents the number of pieces of each type of money at each time (for example, the number of pieces of each type of money per hour) stored in the automatic change machine 5 for each day of the week. With this statistical data, a time range in which the amount of each type of stored money is large, and a time range in which the amount of each type of stored money is small in the automatic change machine 5 during one day can be found for each day of the week. In addition, the amount of each type of money stored in the automatic change machine 5 at each time can be found for each day of the week. In addition, differences in each type of stored money can be found for each day of the week compared to other days of the week.

The weather specific money storage statistics section 14323 stores statistical data that represents the number of pieces of each type of money at each time (for example, the number of pieces of each type of money per hour) stored in the automatic change machine 5 for each type of weather. With this statistical data, a time range in which the amount of each type of stored money is large, and a time range in which the amount of each type of stored money is small in the automatic change machine 5 during one day can be found for each type of weather. In addition, each type of money stored in the automatic change machine 5 at each time can be found for each type of weather. In addition, differences in each type of stored money can be found for each type of weather compared to other types of weather.

The special sale day specific money storage statistics section 14324 stores statistical data that represents the number of pieces of each type of money at each time (for example, the number of pieces of each type of money per hour) stored in the automatic change machine 5 on a special sale day. With this statistical data, a time range in which the amount of each type of stored money is large, and a time range in which the amount of each type of stored money is small in the automatic change machine 5 during one special sale day can be found. In addition, each type of money stored in the automatic change machine 5 at each time on a special sale day can be found. In addition, differences in each type of stored money on a special sale day compared to an ordinary day which is not a special sale day can be found.

The event specific money storage statistics section 14325 stores statistical data that represents the number of pieces of each type of money at each time (for example, the number of pieces of each type of money per hour) stored in the automatic change machine 5 on a day when an event is held. With this statistical data, a time range in which the amount of each type of stored money is large, and a time range in which the amount of each type of stored money is small in the automatic change machine 5 during one day when an event is held can be found. In addition, each type of money stored in the automatic change machine 5 at each time on a day when an event is held can be found. In addition, differences in each type of stored money on a day when an event is held compared an ordinary day when an event is not held can be found.

The server 1 predicts the time period for refilling money and the time period for collecting money in the automatic change machine 5 by estimating the number of customers visiting the store T based on the statistical number of transactions and the statistical number of items in transactions stored in the base data section 1431, and also using the statistical number of pieces of each type of money stored in the automatic change machine 5, which is stored in the stored money statistics section 1432.

Specifically, statistical data that represents the number of transactions on the same day as the current day is extracted from the daily transaction number statistics section 14311. Statistical data that represents the number of transactions on the same day of the week as the current day is extracted from the day-of-week specific transaction number statistics section 14312. Statistical data that represents the number of transactions on a day having the same type of weather as the weather forecast of the current day is extracted from the weather specific transaction number statistics section 14313 based on the meteorological information received from the server 9 installed in the weather forecasting company. If the current day is a special sale day, statistical data that represents the number of transactions on a special sale day is extracted from the special sale day specific transaction number statistics section 14314. If the current day is not a special sale day, statistical data that represents the number of transactions on an ordinary day which is not a special sale day is extracted from the special sale day specific transaction number statistics section 14314. If the current day is a day when an event is held, statistical data that represents the number of transactions on a day when an event is held is extracted from the event specific transaction number statistics section 14315. If the current day is not a day when an event is held, statistical data that represents the number of transactions on a day other than a day when an event is held is extracted from the event specific transaction number statistics section 14315.

Statistical data that represents the number of items in transactions on the same day as the current day is extracted from the daily transaction item number statistics section 14316. Statistical data that represents the number of items in transactions on the same day of the week as the current day is extracted from the day-of-week specific transaction item number statistics section 14317. Statistical data that represents the number of items in transactions on a day having the same type of weather as the weather forecast of the current day is extracted from the weather specific transaction item number statistics section 14318 based on the meteorological information received from the server 9. If the current day is a special sale day, statistical data that represents the number of items in transactions on a special sale day is extracted from the special sale day specific transaction item number statistics section 14319. If the current day is not a special sale day, statistical data that represents the number of items in transactions on a day other than a special sale day is extracted from the special sale day specific transaction item number statistics section 14319. If the current day is a day when an event is held, statistical data that represents the number of items in transactions on a day when an event is held is extracted from the event specific transaction item number statistics section 14320. If the current day is not a day when an event is held, statistical data that represents the number of items in transactions on a day other than a day when an event is held is extracted from the event specific transaction item number statistics section 14320.

A quiet time period and a crowded time period of the current day for customers in the store T are estimated based on the extracted statistical data. Specifically, for example, the number of customers visiting on the current day is estimated as the average value of the extracted statistical data. In addition, for example, priorities are assigned to the statistical data, and the number of customers visiting on the current day is estimated as the average value of the statistical data that is weighted in order of priority. The quiet time period and the crowded time period of the current day for customers in the store T are estimated based on the estimated number of customers visiting on the current day. The quiet time period is estimated as a time period when the number of customers visiting the store is the smallest. The crowded time period is estimated as a time period when the number of customers visiting the store is the largest.

Next, a time period of a state where the storage unit is almost filled to capacity with money (hereinafter, referred to as "near full," i.e., a state where the storage unit is not filled yet but will be filled soon), and a time period of a state where the storage unit in which money is stored is almost empty (hereinafter, referred to as "near empty," i.e., a state where the storage unit is not empty yet but will become empty soon) are estimated for each type of money based on the statistical number of pieces of each type of money stored in the automatic change machine 5.

Specifically, statistical data that represents a statistical number of pieces of each type of money stored in the automatic change machine 5 on the same day as the current day is extracted from the daily money storage statistics section 14321. Statistical data that represents a statistical number of pieces of each type of money stored in the automatic change machine 5 on the same day of the week as the current day is extracted from the day-of-week specific money storage statistics section 14322. Statistical data that represents a statistical number of pieces of each type of money stored in the automatic change machine 5 on a day having the same type of weather as the weather forecast of the current day is extracted from the weather specific money storage statistics section 14323 based on the meteorological information received from the server 9. If the current day is a special sale day, statistical data that represents a statistical number of pieces of each type of money stored in the automatic change machine 5 on a special sale day is extracted from the special sale day specific money storage statistics section 14324. If the current day is not a special sale day, statistical data that represents a statistical number of pieces of each type of money stored in the automatic change machine 5 on a day other than a special sale day is extracted from the special sale day specific money storage statistics section 14324. If the current day is a day when an event is held, statistical data that represents a statistical number of pieces of each type of money stored in the automatic change machine 5 on a day when an event is held is extracted from the event specific money storage statistics section 14325. If the current day is not a day when an event is held, statistical data that represents a statistical number of pieces of each type of money stored in the automatic change machine 5 on a day other than a day when an event is held is extracted from the event specific money storage statistics section 14325.

The near full time period and the near empty time period of the current day for the storage unit of the automatic change machine 5 are estimated based on the extracted statistical data. Specifically, for example, the near full time period and the near empty time period for the automatic change machine 5 are estimated based on the average value of the extracted statistical data. In addition, for example, priorities are assigned to the statistical data, and the near full time period and the near empty time period for the automatic change machine 5 are estimated based on the average value of the statistical data that is weighted in order of priority.

The "near full" is desirably a state slightly before the storage unit actually becomes full. That is, the near full time period is desirably a time period slightly before the storage unit is at maximum capacity. The "near empty" is desirably a state slightly before the storage unit actually becomes empty. That is, the near empty time period is desirably a time period slightly before the storage unit is empty. An appropriate refill time period for refilling money and an appropriate collection time period for collecting money are predicted based on the estimated quiet time period and the near full or near empty time period.

For example, if the estimated quiet time period and the near full time period approximately match each other, the matching time period is predicted as the collection time period for money. If the estimated quiet time period and the near empty time period approximately match each other, the matching time period is predicted as the refill time period for money. If the estimated quiet time period and the near full time period or the near empty time period do not match each other, a time period included in the quiet time period, or a time period that is between both time periods and is close to the quiet time period is predicted as the collection time period or the refill time period.

The server 1 predicts an appropriate refill time period or an appropriate collection time period in which the number of customers is relatively small, and transmits information in a displayable manner such that the POS terminal 3 can display the time period. The POS terminal 3 displays the appropriate refill time period or the appropriate collection time period based on the received information. By doing so, refill or collection of money in the automatic change machine 5 can be performed in an appropriate time period when the number of customers visiting the store T is relatively small.

The server 1 corrects the near empty or near full time period based on the statistical number of pieces of each type of money and the actual number of pieces of each type of money stored in the change management unit 144. For example, the server 1 compares the statistical number of pieces of each type of money with the actual number of pieces of each type of money stored in the change management unit 144. Consequently, if the statistical number of pieces of each type of money is larger than the actual number of pieces of each type of money, the server 1 corrects the near empty or near full time period to be later than the current estimated time period. The server 1 corrects the refill time period or the collection time period to be later than the current predicted time period. If the actual number of pieces of each type of money is larger than the statistical number of pieces of each type of money, the server 1 corrects the near empty or near full time period to be sooner than the current estimated time period. The server 1 corrects the refill time period or the collection time period to be sooner than the current predicted time period.

The refill time period or the collection time period may also be corrected by estimating the number of visiting customers through comparison of the statistical number of visiting customers with the actual number of visiting customers.

Next, the used receipt amount statistics section 1433 will be described. The used receipt amount statistics section 1433 includes a daily used receipt amount statistics section 14331, a day-of-week specific used receipt amount statistics section 14332, a weather specific used receipt amount statistics section 14333, a special sale day specific used receipt amount statistics section 14334, and an event specific used receipt amount statistics section 14335.

The daily used receipt amount statistics section 14331 stores statistical data that represents the amount of use of the receipt paper at each time (for example, the amount of use of the receipt paper per hour). With this statistical data, a time range in which the amount of use of the receipt paper is large, and a time range in which the amount of use of the receipt paper is small in the POS terminal 3 during one day can be found. In addition, the amount of use of the receipt paper at each time in a predetermined period (for example, the first to the thirtieth (or the thirty-first) of each month) can be found. In addition, differences in the amount of use of the receipt paper for each time compared to other times can be found.

The day-of-week specific used receipt amount statistics section 14332 stores statistical data that represents the amount of use of the receipt paper at each time (for example, the amount of use of the receipt paper per hour) for each day of the week. With this statistical data, a time range in which the amount of use of the receipt paper is large, and a time range in which the amount of use of the receipt paper is small in the POS terminal 3 during one day can be found for each day of the week. In addition, the amount of use of the receipt paper at each time can be found for each day of the week. In addition, differences in the amount of use of the receipt paper can be found for each day of the week compared to other days of the week.

The weather specific used receipt amount statistics section 14333 stores statistical data that represents the amount of use of the receipt paper at each time (for example, the amount of use of the receipt paper per hour) for each type of weather. With this statistical data, a time range in which the amount of use of the receipt paper is large, and a time range in which the amount of use of the receipt paper is small in the POS terminal 3 during one day can be found for each type of weather. In addition, the amount of use of the receipt paper at each time can be found for each type of weather. In addition, differences in the amount of use of the receipt paper can be found for each type of weather compared to other types of weather.

The special sale day specific used receipt amount statistics section 14334 stores statistical data that represents the amount of use of the receipt paper at each time (for example, the amount of use of the receipt paper per hour) on a special sale day. With this statistical data, a time range in which the amount of use of the receipt paper is large, and a time range in which the amount of use of the receipt paper is small in the POS terminal 3 on a special sale day can be found. In addition, the amount of use of the receipt paper at each time on a special sale day can be found. In addition, differences in the amount of use of the receipt paper on a special sale day compared an ordinary day which is not a special sale day can be found.

The event specific used receipt amount statistics section 14335 stores statistical data that represents the amount of use of the receipt paper at each time (for example, the amount of use of the receipt paper per hour) on a day when an event is held. With this statistical data, a time range in which the amount of use of the receipt paper is large, and a time range in which the amount of use of the receipt paper is small in the POS terminal 3 on a day when an event is held can be found. In addition, the amount of use of the receipt paper at each time on a day when an event is held can be found. In addition, differences in the amount of use of the receipt paper on a day when an event is held compared an ordinary day when an event is not held can be found.

The server 1 predicts the replacement time period for the receipt paper stored in the receipt issuing device by estimating the number of customers visiting the store T based on the statistical number of transactions and the statistical number of items in transactions stored in the base data section 1431, and also using the statistical amount of use of the receipt paper in the POS terminal 3, which is stored in the used receipt amount statistics section 1433.

Specifically, statistical data that represents a statistical amount of use of the receipt paper on the same day as the current day is extracted from the daily used receipt amount statistics section 14331. Statistical data that represents a statistical amount of use of the receipt paper on the same day of the week as the current day is extracted from the day-of-week specific used receipt amount statistics section 14332. Statistical data that represents a statistical amount of use of the receipt paper on a day having the same type of weather as the weather forecast of the current day is extracted from the weather specific used receipt amount statistics section 14333 based on the meteorological information received from the server 9. If the current day is a special sale day, statistical data that represents the amount of use of the receipt paper on a special sale day is extracted from the special sale day specific used receipt amount statistics section 14334. If the current day is a day other than a special sale day, statistical data that represents the amount of use of the receipt paper on a day other than a special sale day is extracted from the special sale day specific used receipt amount statistics section 14334. If the current day is a day when an event is held, statistical data that represents the amount of use of the receipt paper on a day when an event is held is extracted from the event specific used receipt amount statistics section 14335. If the current day is a day other than a day when an event is held, statistical data that represents the amount of use of the receipt paper on a day other than a day when an event is held is extracted from the event specific used receipt amount statistics section 14335.

A time period of a state where the receipt paper stored in the receipt issuing device will be used up soon (hereinafter, referred to as "near end" (i.e., a state where the receipt paper is not used up yet but will be used up soon)") is estimated based on the statistical change in the amount of use of the receipt paper. Specifically, for example, the near end time period of the current day for the receipt paper is estimated based on the average value of the extracted statistical data. In addition, for example, priorities are assigned to the statistical data, and the near end time period of the current day for the receipt paper is estimated based on the average value of the statistical data that is weighted in order of priority.

The "near end" is desirably a state slightly before an end of the receipt paper where a red band-shaped line is printed at both ends is reached. That is, the near end time period (time range) is desirably a time period slightly before the end of the receipt paper is reached. An appropriate replacement time period for replacing the receipt paper is predicted based on the estimated quiet time period and the near end time period.

For example, if the estimated quiet time period and the near end time period match approximately, the matching time period is predicted as the replacement time period. If the estimated quiet time period and the near end time period do not match, a time period included in the quiet time period, or a time period that is between both time periods and is close to the quiet time period is predicted as the replacement time period.

The server 1 predicts an appropriate replacement time period in which the number of customers is relatively small, and transmits information in a displayable manner such that the POS terminal 3 can display the time period. The POS terminal 3 displays) the optimal replacement time period based on the received information. By doing so, the receipt paper in the POS terminal 3 can be replaced in a time period when the number of customers visiting the store T is relatively small.

The server 1 corrects the near end time period for the receipt paper based on the statistical amount of use of the receipt paper and the actual amount of use of the receipt paper stored in the receipt management unit 145. Specifically, the server 1 compares the statistical c amount of use of the receipt paper with the actual amount of use of the receipt paper stored in the receipt management unit 145. Consequently, if the statistical amount of use of the receipt paper is larger than the actual amount of use of the receipt paper, the server 1 corrects the near end time period to be later than the current estimated time period. The server 1 corrects the replacement time period to be later than the current predicted time period. If the actual amount of use of the receipt paper is larger than the statistical amount of use of the receipt paper, the server 1 corrects the near end time period to be sooner than the current estimated time period. The server 1 corrects the replacement time period to be sooner than the current predicted time period.

The replacement time period may also be corrected by estimating the number of visiting customers through comparison of the statistical number of visiting customers with the actual number of visiting customers.

Figure 4:
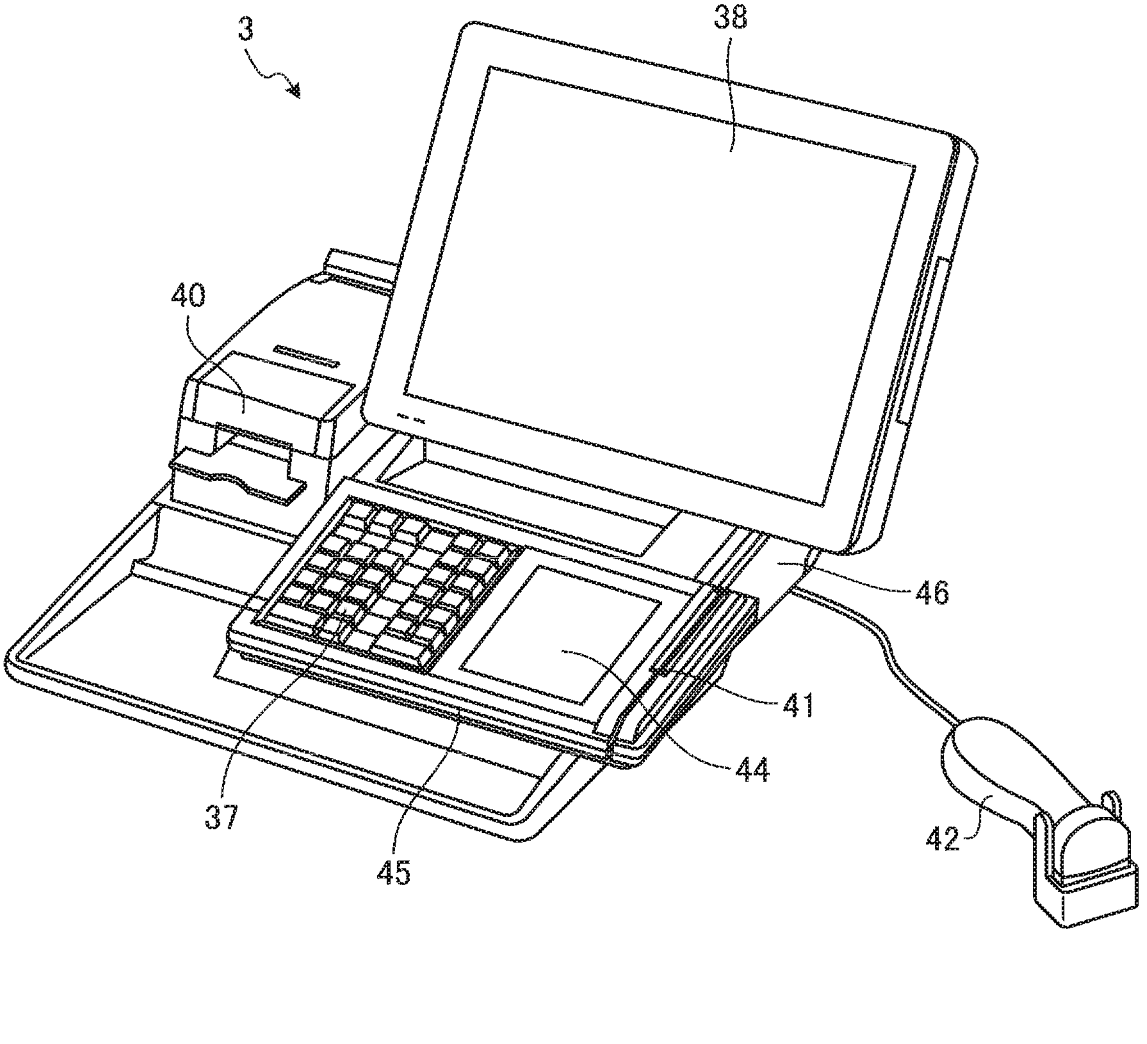
FIG. 4 is a perspective view illustrating a POS terminal.

Hereinafter, the POS terminal 3 will be described. FIG. 4 is a perspective view illustrating the POS terminal. In FIG. 4, the POS terminal 3 includes a main body 46 and a combination keyboard 45. An operator-use display device 38, the printing device 40 as the receipt issuing device, a code reader 42, and the like are disposed in the main body 46. In addition, the main body 46 includes a control unit 300, a customer-use display device 39 (refer to FIG. 5), and the like. The operator-use display device 38 displays information to an operator. The customer-use display device 39 displays information to customers. For example, the printing device 40 is equipped with a thermal head and issues receipts by printing information using the thermal head on the receipt paper that is thermal paper. The code reader 42 reads symbols assigned to commodities. The POS terminal 3 acquires the commodity code specifying each commodity based on the read symbols. The code reader 42 may specify commodities using a general object recognition technology based on captured images of commodities.

The combination keyboard 45 can be detached from the main body 46. The combination keyboard 45 includes an operation unit 37, a subdisplay device 44, and a card reader 41. The operation unit 37 is a keyboard that includes a payment key 371. The payment key 371 is operated at the time of announcing the payment in a transaction with a customer. The subdisplay device 44 displays information to the operator. The subdisplay device 44 displays supplementary information, communication information regarding the store, and the like that are not displayed on the operator-use display device 38. The subdisplay device 44 displays the collection time period or the refill time period for collecting or refilling money, or the replacement time period for replacing the receipt paper as a message to the operator.

Figure 5:
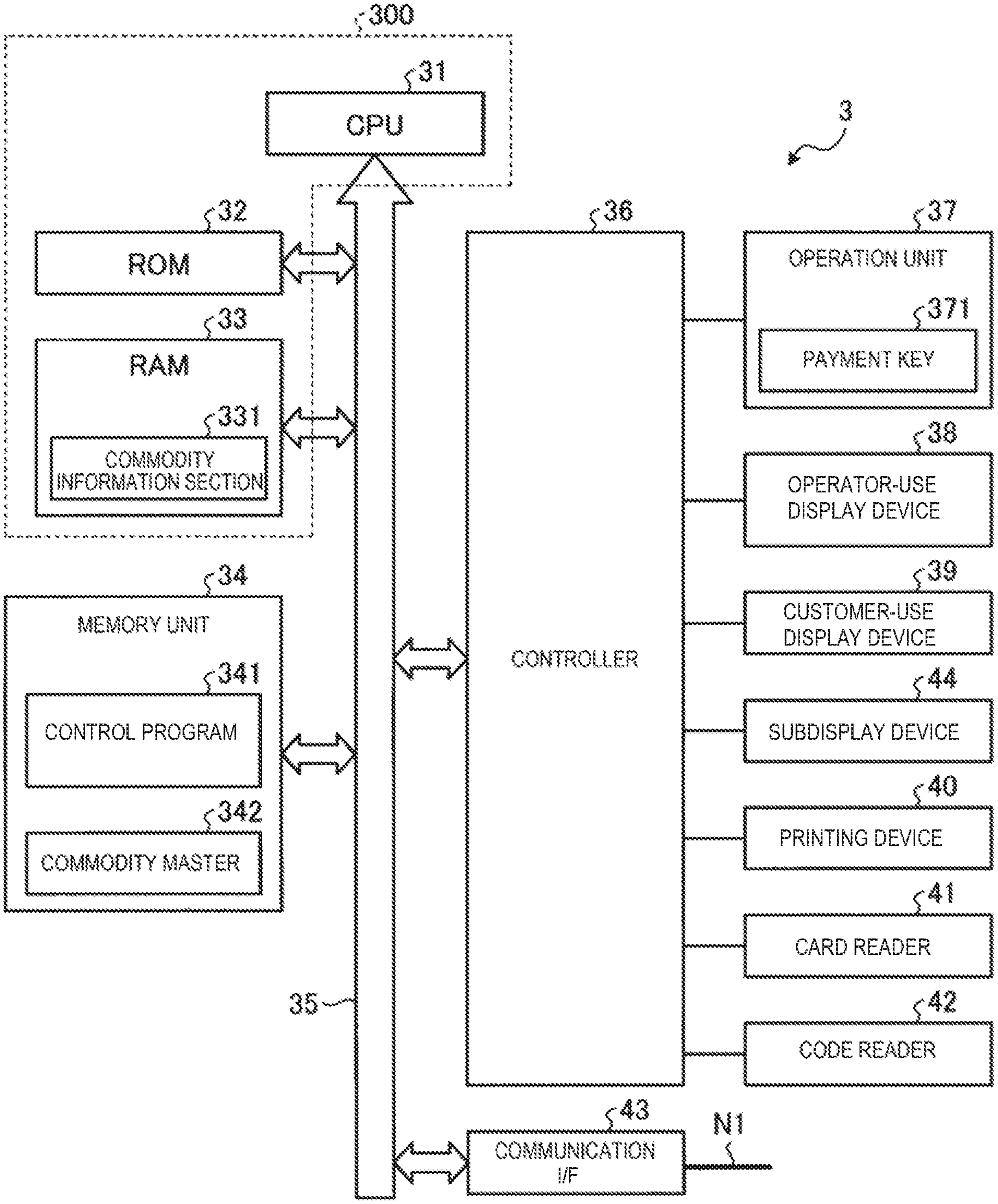
FIG. 5 is a block diagram illustrating a hardware configuration of the POS terminal.

Next, a hardware configuration of the POS terminal 3 will be described. FIG. 5 is a block diagram illustrating a hardware configuration of the POS terminal 3. As illustrated in FIG. 5, the POS terminal 3 includes a CPU 31, a ROM 32, a RAM 33, a memory unit 34, and the like. The CPU 31 is a main unit of control. The ROM 32 stores various programs. Programs and various types of data are loaded into the RAM 33. The memory unit 34 stores various programs. The CPU 31, the ROM 32, the RAM 33, and the memory unit 34 are connected to each other through a bus 35. The CPU 31, the ROM 32, and the RAM 33 constitute the control unit 300. That is, the control unit 300 executes a control, described later, related to the POS terminal 3 by operating the CPU 31 in accordance with a control program that is stored in the ROM 32 or the memory unit 34 and loaded into the RAM 33.

The RAM 33 includes a commodity information section 331. The commodity information section 331 stores the commodity information (a commodity name, a price of a commodity, and the like) related to commodities that are subjected to the sales registration based on the commodity code acquired from symbols read by the code reader 42.

The memory unit 34 is a non-volatile memory device such as an HDD or a flash memory that retains stored information even if power is off. The memory unit 34 includes a control program 341, a commodity master 342, and the like. The control program section 341 is the control program that is used for controlling the POS terminal 3. For each commodity code specifying a commodity, the commodity master 342 stores the commodity information related to the commodity.

The control unit 300 is connected to the operation unit 37, the operator-use display device 38, the customer-use display section 39, the subdisplay device 44, the printing device 40, the card reader 41, and the code reader 42 through the bus 35 and a controller 36.

The control unit 300 is also connected to a communication interface (I/F) 43 through the bus 35. The communication interface 43 is communicably connected to the server 1 and the other POS terminals 3 through the communication line N1.

Figure 6:
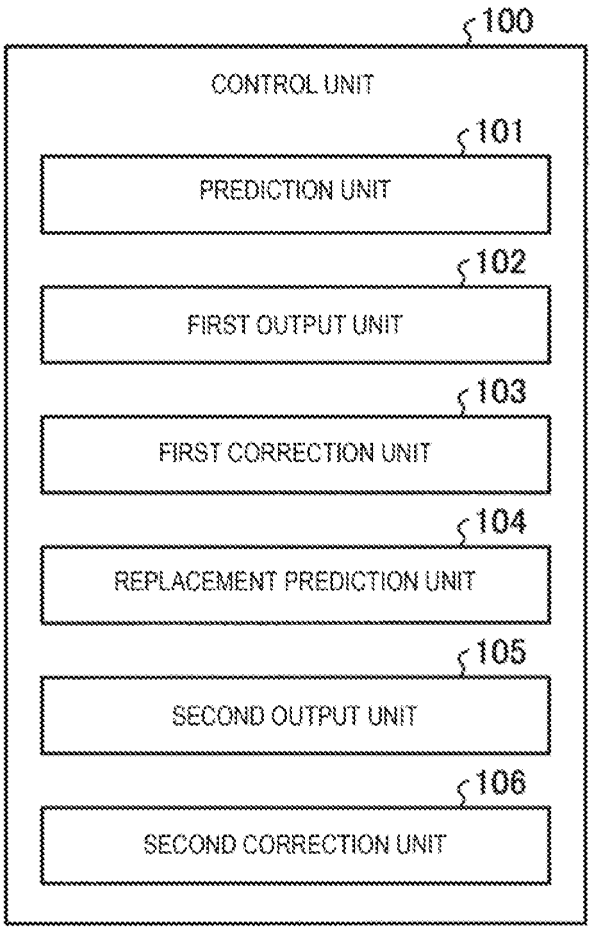
FIG. 6 is a function block diagram illustrating a functional configuration of the server.

Hereinafter, control of the server 1 and the POS terminal 3 will be described. First, control of the server 1 will be described. FIG. 6 is a function block diagram illustrating a functional configuration of the server 1. In accordance with the control program stored in the ROM 12 or the control program 141 stored in the memory unit 14, the control unit 100 functions as a prediction unit 101, a first output unit 102, a first correction unit 103, a replacement prediction unit 104, a second output unit 105, and a second correction unit 106.

The prediction unit 101 has a function of predicting at least one of an appropriate collection time period for collecting money stored in the automatic change machine 5 or an appropriate refill time period for refilling money in the automatic change machine 5 based on the first statistical information (i.e., the statistical information related to the number of customers visiting the store T at the time, which is stored in the base data section 1431), and the second statistical information (i.e., the statistical information related to the amount of money stored in the automatic change machine 5 at the time, which is stored in the stored money statistics section 1432).

The first output unit 102 has a function of transmitting at least one of the predicted collection time period or the predicted refill time period to the POS terminal 3 in a displayable manner.

The first correction unit 103 has a function of correcting at least one of the collection time period for money or the refill time period predicted by the prediction unit 101 based on the actual number of pieces of each type of money stored in the automatic change machine 5.

The replacement prediction unit 104 has a function of predicting an appropriate replacement time period for replacing the stored receipt paper based on the first statistical information (i.e., the statistical change in the number of customers visiting the store T at the time, which is stored in the base data section 1431), and the third statistical information (i.e., the statistical change in the amount of use of the receipt paper at the time, which is stored in the used receipt amount statistics section 1433).

The second output unit 105 has a function of transmitting information related to the predicted replacement time period to the POS terminal 3 in a displayable manner.

The second correction unit 106 has a function of correcting the replacement time period predicted by the replacement prediction unit 104 based on the actual amount of use of the stored receipt paper.

Figure 7:
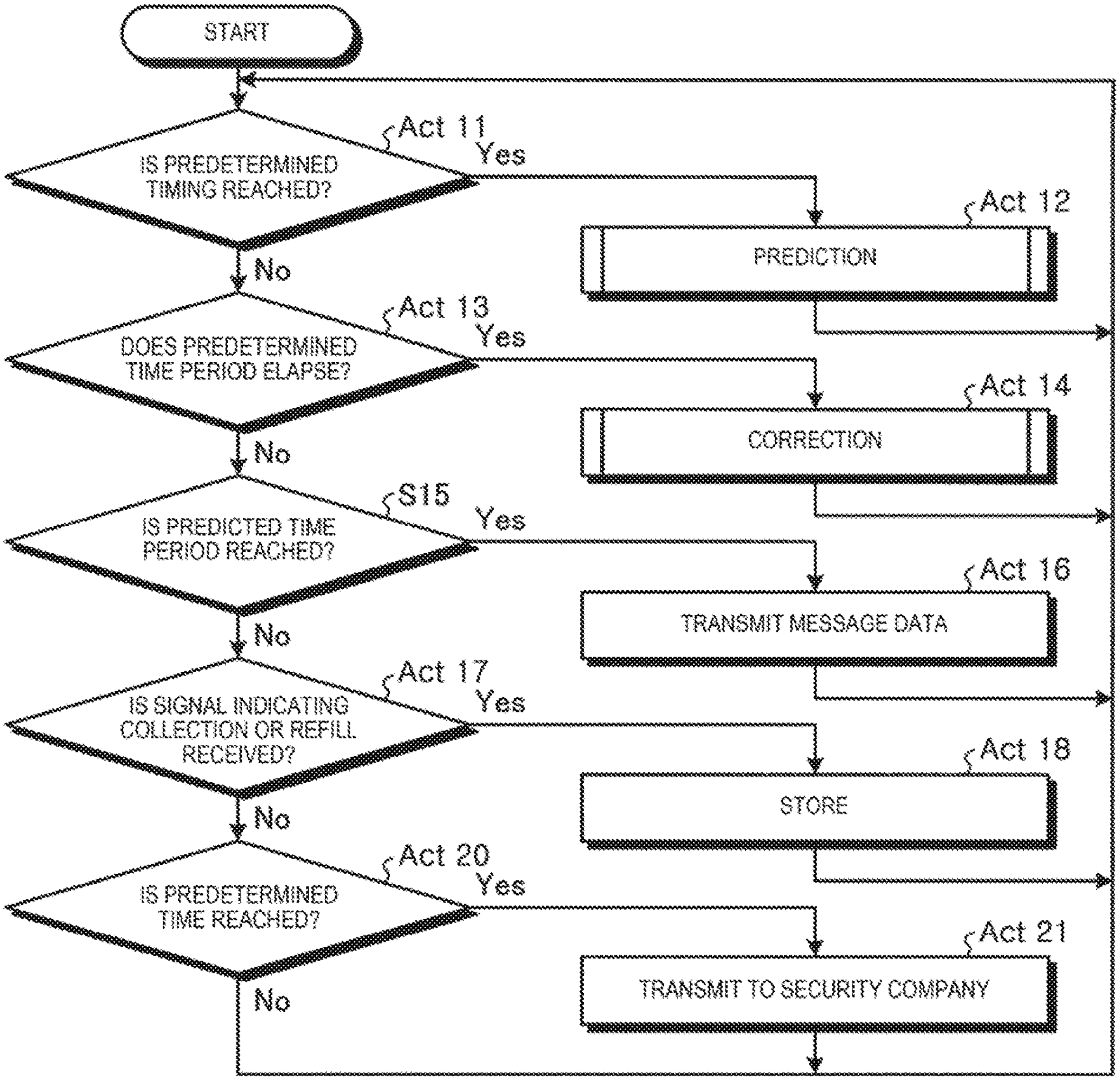
FIG. 7 is a flowchart illustrating a flow of processing performed by the server.

Next, a control processing performed by the server 1 for predicting the refill time period and the collection time period will be described. FIG. 7 is a flowchart illustrating the flow of the processing performed by the server 1 for predicting the refill time period and the collection time period in the automatic change machine 5. In FIG. 7, the control unit 100 determines whether or not a predetermined timing is reached (Act 11). The determination of whether the predetermined timing is reached in Act 11 is performed at, for example, a time slightly before the opening of the store T. At this timing, the collection time period and the refill time period of the current day in the automatic change machine 5 are predicted. If the control unit 100 determines that the predetermined timing is reached (Yes in Act 11), the control unit 100 executes prediction (Act 12). The control unit 100 returns to Act 11.

Figure 8:
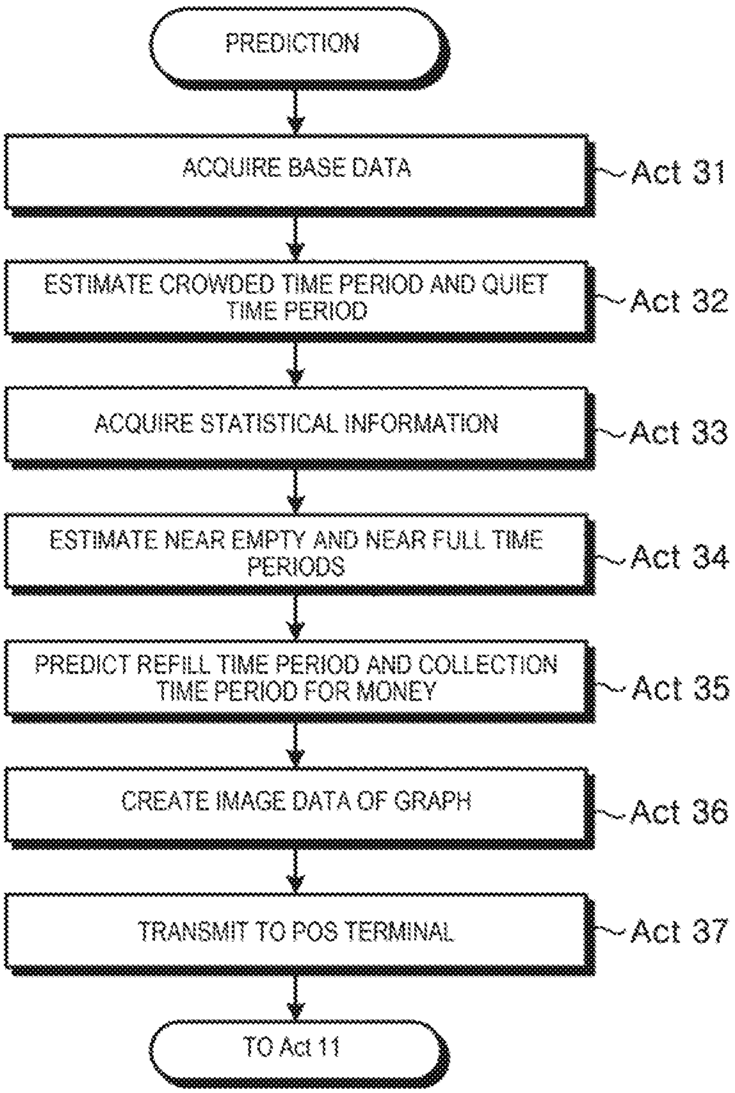
FIG. 8 is a flowchart illustrating a flow of prediction processing performed by the server.

FIG. 8 is a flowchart illustrating the prediction processing performed by the control unit 100 in Act 12. In FIG. 8, the control unit 100 acquires base data related to the statistical number of transactions and number of items in transactions from the base data section 1431 of the statistics section 143 based on the year, the month, the date, and the day of the week of the current day, the presence of a special sale, the presence of an event, the meteorological information, and the like (Act 31). The control unit 100 finds the number of transactions on the current day and the number of items in transactions on the current day from the acquired base data. The control unit 100 estimates the number of customers visiting the store T on the current day from the found number of transactions and number of items in transactions. The control unit 100 estimates the quiet time period and the crowded time period of the current day based on the estimated number of visiting customers (Act 32). Next, the control unit 100 acquires the statistical information related to money stored in the automatic change machine 5 from the stored money statistics section 1432 based on the year, the month, the date, and the day of the week of the current day, the presence of a special sale, the presence of an event, the meteorological information, and the like (Act 33). The control unit 100 finds the number of pieces of money stored in the automatic change machine 5 from the acquired information. The control unit 100 estimates the near empty time period and the near full time period for the automatic change machine 5 based on the estimated number of pieces of money (Act 34). The control unit 100 (prediction unit 101) predicts the refill time period and the collection time period for the automatic change machine 5 based on the estimated quiet time period and the estimated near empty time period and the near full time period (Act 35).

Next, the control unit 100 creates image data of a graph that visualizes information related to the estimated change in the number of customers and the predicted refill time period and the predicted collection time period (Act 36). The control unit 100 (first output unit 102) transmits the created image data of the graph to the POS terminal 3 (Act 37).

Returning to FIG. 7 again, if the control unit 100 in Act 11 determines that the predetermined timing is not reached (No in Act 11), the control unit 100 determines whether or not a predetermined time period (for example, one hour) elapses from the predetermined timing in Act 11 (or the opening time of the store) (Act 13). If the control unit 100 determines that the predetermined time period elapses (Yes in Act 13), the control unit 100 executes a correction processing (Act 14). The control unit 100 then returns to Act 11.

Figure 9:
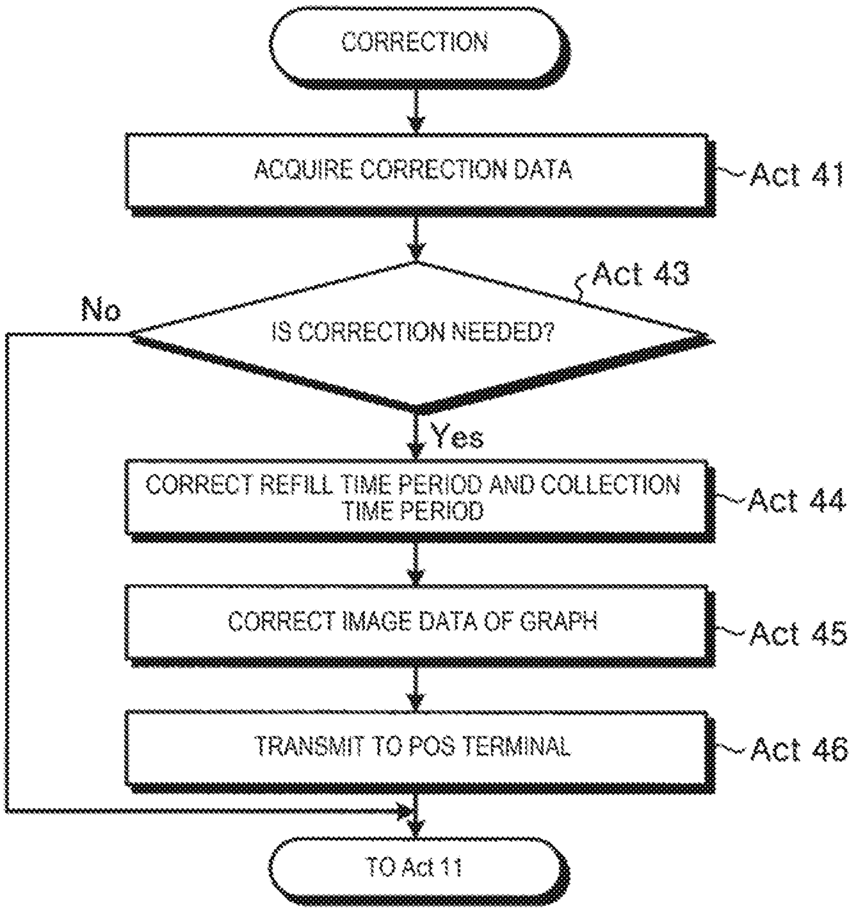
FIG. 9 is a flowchart illustrating a flow of correction processing performed by the server.

FIG. 9 is a flowchart illustrating the correction processing performed by the control unit 100 in Act 14. In FIG. 9, the control unit 100 acquires correction data (Act 41). The correction data is information that is stored in the change management unit 144 and related to each type of money actually stored in the automatic change machine 5. Next, the control unit 100 compares the statistical number of pieces of each type of money with the actual number of pieces of each type of money stored in the change management unit 144. The control unit 100 determines whether or not the refill time period and the collection time period for money need to be corrected based on the result of comparison (Act 43). If there is no difference between the statistical number of pieces of each type of money and the actual number of pieces of each type of money stored in the change management unit 144, the control unit 100 determines that the refill time period and the collection time period do not need to be corrected. If there is a difference between the statistical number of pieces of each type of money and the actual number of pieces of each type of money stored in the change management unit 144, the control unit 100 determines that the refill time period and the collection time period need to be corrected.

If the control unit 100 determines that the refill time period and the collection time period need to be corrected (Yes in Act 43), the control unit 100 estimates the near empty time period and the near full time period for the automatic change machine 5 again based on the difference. The control unit 100 (first correction unit 103) corrects the refill time period and the collection time period predicted in Act 35 for money in the automatic change machine 5 based on the estimated near empty time period and the near full time period, and information related to the number of visiting customers (Act 44).

Next, the control unit 100 corrects the image data of the graph created in Act 36 based on the corrected refill time period and collection time period (Act 45). The control unit 100 transmits the corrected image data of the graph to the POS terminal 3 (Act 46). If the control unit 100 determines that the refill time period and the collection time period do not need to be corrected (No in Act 43), the control unit 100 returns to Act 11 without processing Act 44 to Act 46.

Returning to FIG. 7 again, if the control unit 100 in Act 13 determines that the predetermined time period does not elapse (No in Act 13), the control unit 100 determines whether or not the predicted time period for refill or collection predicted in Act 35 or the predicted time period corrected in Act 44 is reached (Act 15). If the control unit 100 determines that the predicted time period is reached (Yes in Act 15), the control unit 100 transmits message data representing a message to the POS terminal 3 (Act 16). If the predicted time period is for refilling money, the control unit 100 transmits message data indicating a message that prompts refilling money. If the predicted time period is for collecting money, the control unit 100 transmits message data indicating a message that prompts collecting money. The control unit 100 returns to Act 11.

If the control unit 100 determines that the predicted time period for refill or collection of money is not reached (No in Act 15), the control unit 100 determines whether or not a signal indicating that refill or collection of money is performed is received from the POS terminal 3 (Act 17). If the control unit 100 determines that the signal is received (Yes in Act 17), the control unit 100 stores the amount and the number of pieces of refilled or collected money in the RAM 13 (Act 18). The control unit 100 returns to Act 11.

If the control unit 100 determines that the signal indicating that refill or collection of money is performed is not received (No in Act 17), the control unit 100 determines whether or not a predetermined time that is set in advance is reached (Act 20). If the control unit 100 determines that the predetermined time is reached (Yes in Act 20), the control unit 100 transmits amount information stored in the RAM 13 to the server 7 in the security company (Act 21). The control unit 100 returns to Act 11. If the control unit 100 determines that the predetermined time is not reached (No in Act 20), the control unit 100 returns to Act 11.

If money for change and the like are needed again, the security company that receives the amount information withdraws money from the bank and transports the money to the store T. If there is money to be collected from the store T, the security company visits the store T to collect the money.

Figure 10:
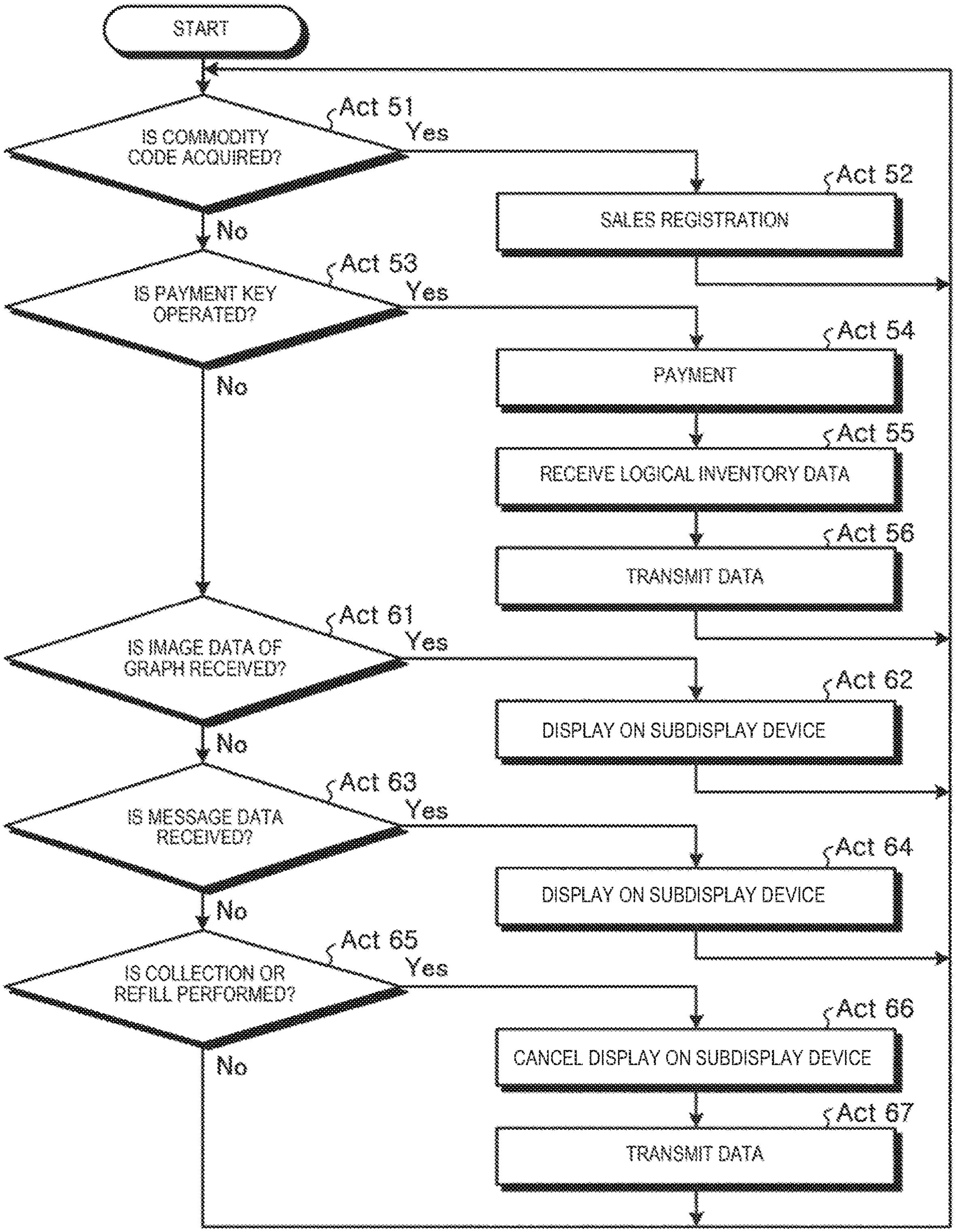
FIG. 10 is a flowchart illustrating a flow of processing performed by the POS terminal.

Next, control of the POS terminal 3 will be described. FIG. 10 is a flowchart illustrating the flow of the processing performed by the POS terminal. In FIG. 10, the control unit 300 determines whether or not the commodity code is acquired based on the symbols read by the code reader 42 (Act 51). If the control unit 300 determines that the commodity code is acquired (Yes in Act 51), the control unit 300 searches the commodity master 342 based on the commodity code, acquires the commodity information related to the commodity specified by the commodity code, and stores the commodity information in the commodity information section 331 (Act 52). The control unit 300 returns to Act 51.

If the control unit 300 determines that the commodity code is not acquired (No in Act 51), the control unit 300 determines whether or not the payment key 371 is operated (Act 53). If the control unit 300 determines that the payment key 371 is operated (Yes in Act 53), the control unit 300 executes the payment processing for the transaction based on the commodity information stored in the commodity information section 331 and money received from the customer (Act 54). Next, the control unit 300 transmits the change information to the automatic change machine 5. The control unit 300 receives data of the current inventory of each type of money (reflecting deposits and withdrawals) from the automatic change machine (Act 55). The current inventory is information related to money stored in the automatic change machine 5. The current inventory is a numerical value as data and is calculated based on the amount of preparatory money for change, the amount of deposited money, and the amount of withdrawn money. The current inventory data is stored in the automatic change machine 5 and includes the number of pieces and the amount of each type of money. Each time there is a deposit or a withdrawal of money, the automatic change machine 5 updates the current inventory data to up-to-date data. Next, the control unit 300 transmits the commodity information and the payment information related to the payment, and the current inventory data received from the automatic change machine 5 to the server 1 (Act 56). The control unit 300 returns to Act 51.

If the control unit 300 in Act 53 determines that the payment key 371 is not operated (No in Act 53), the control unit 300 determines whether or not the image data of the graph transmitted by the server 1 in the process of Act 37 or the process of Act 46 is received (Act 61). If the control unit 300 determines that the image data of the graph is received (Yes in Act 61), the control unit 300 displays an image graph based on the image data of the graph on the subdisplay device 44 (Act 62). The control unit 300 returns to Act 51. The control unit 300 may display the graph image on the operator-use display device 38 instead of the subdisplay device 44.

Figure 11:
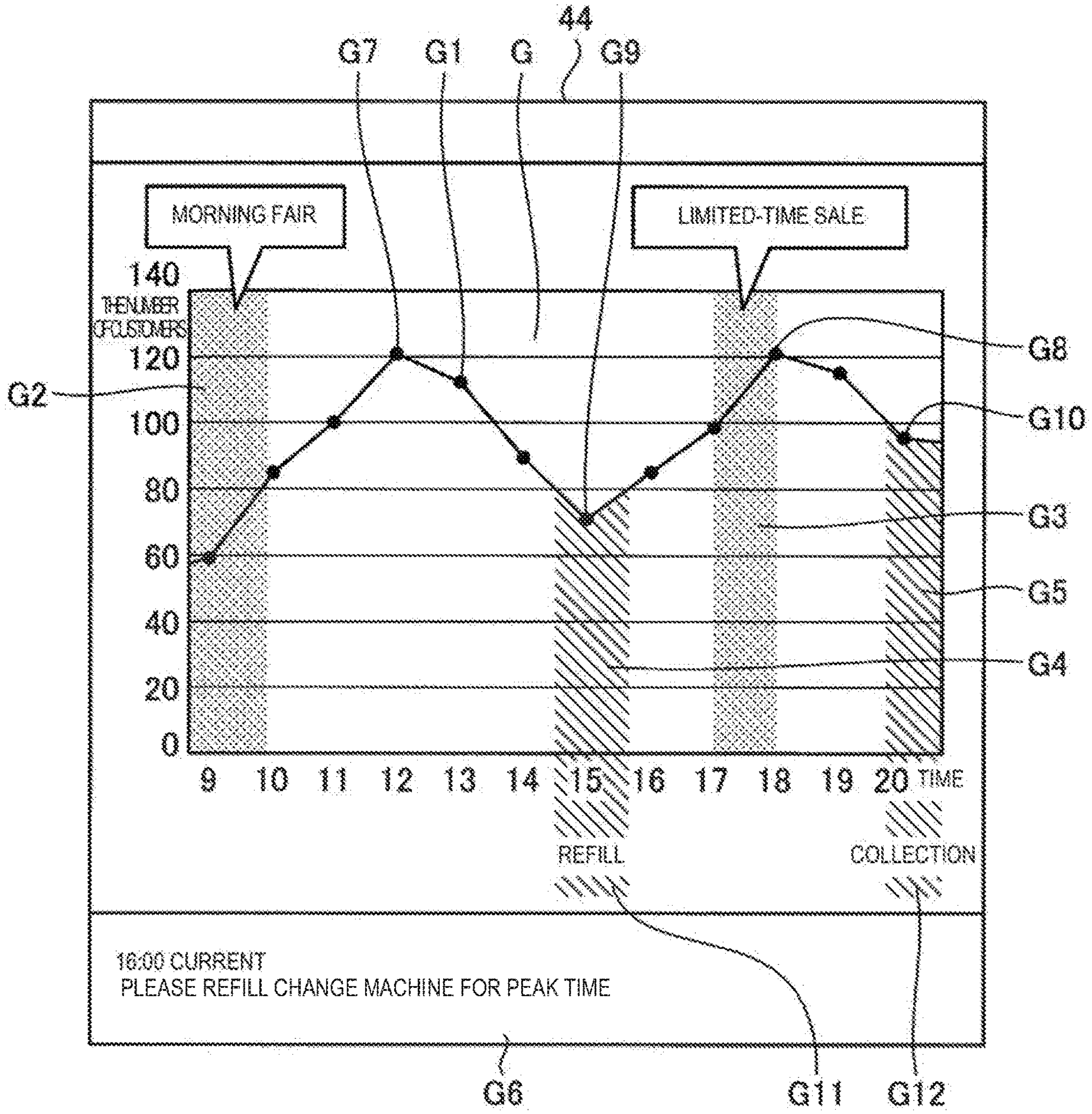
FIG. 11 illustrates an example of a display screen displayed on the POS terminal.

FIG. 11 is one example of a graph image G displayed in Act 62. As illustrated in FIG. 11, the graph image G includes a horizontal axis as a time axis from the opening to the closing of the store T, and a vertical axis as the number of visiting customers. A line G1 illustrated in the graph image G represents a change in the number of visiting customers at each time during one day. In the example in FIG. 11, the number of customers continues increasing from the opening time of the store and reaches a first peak (position of G7) at around 12:00. In the afternoon, the number of customers starts to decrease and reaches a bottom (position of G9) at around 15:00. Then, until the evening, the number of customers is increased again and reaches a second peak (position of G8) at around 18:00. Then, the number of customers is decreased until the closing time of the store and reaches a second bottom (position of G10) at a time immediately before the closing of the store. That is, the store T has the crowded time period near times G7 and G8, and has the quiet time period near times G9 and G10.

The time range of an event on the current day is also illustrated in FIG. 11. In the example in FIG. 11, a morning fair G2 is held in a time range of 09:00 to 10:00, and a limited-time sale G3 is held in a time range of 17:00 to 18:00.

In the example in FIG. 11, a time range G11 that includes a quiet time period G9 is predicted as a refill time period G4. A time range G12 that includes a quiet time period G10 is predicted as a collection time period G5. The operator or a person in charge can view the graph image G and confirm the refill time period G4 and the collection time period G5. By performing refill and collection of money during the confirmed time period in which the number of customers is relatively small, influence on the customers can be minimized.

Returning to FIG. 10 again, if the control unit 300 in Act 61 determines that the image data of the graph is not received (No in Act 61), the control unit 300 determines whether or not the message data transmitted by the server 1 in Act 16 is received (Act 63). If the control unit 300 determines that the message data is received (Yes in Act 63), the control unit 300 displays the message indicated by the message data on the subdisplay device 44 (Act 64). The control unit 300 returns to Act 51.

As illustrated in FIG. 11, the control unit 300 displays the message displayed in the process of Act 64 in a lower part G6 of the graph image G. The operator or the person who performs refill or collection of money can view and remember to comply with the message. In addition, the operator or the person who forgets to perform refill or collection of money can view the message and recall that refill or collection of money is to be performed.

Returning to FIG. 10 again, if the control unit 300 in Act 63 determines that the message data is not received (No in Act 63), the control unit 300 determines whether or not refill or collection of money from the automatic change machine 5 is executed (Act 65). If the control unit 300 determines that refill or collection of money is executed (Yes in Act 65), the control unit 300 removes the message displayed in the lower part G6 of the graph image G (Act 66). The control unit 300 transmits the amount and the number of pieces of money refilled or collected to the server 1 (Act 67). The control unit 300 returns to Act 51. If the control unit 300 determines that the signal indicating that refill or collection of money is executed is not received (No in Act 65), the control unit 300 returns to Act 51.

According to the embodiment, the server 1 can predict an appropriate refill time period or a collection time period for the automatic change machine 5 and transmit the refill time period or the collection time period to the POS terminal 3.

Figure 12:
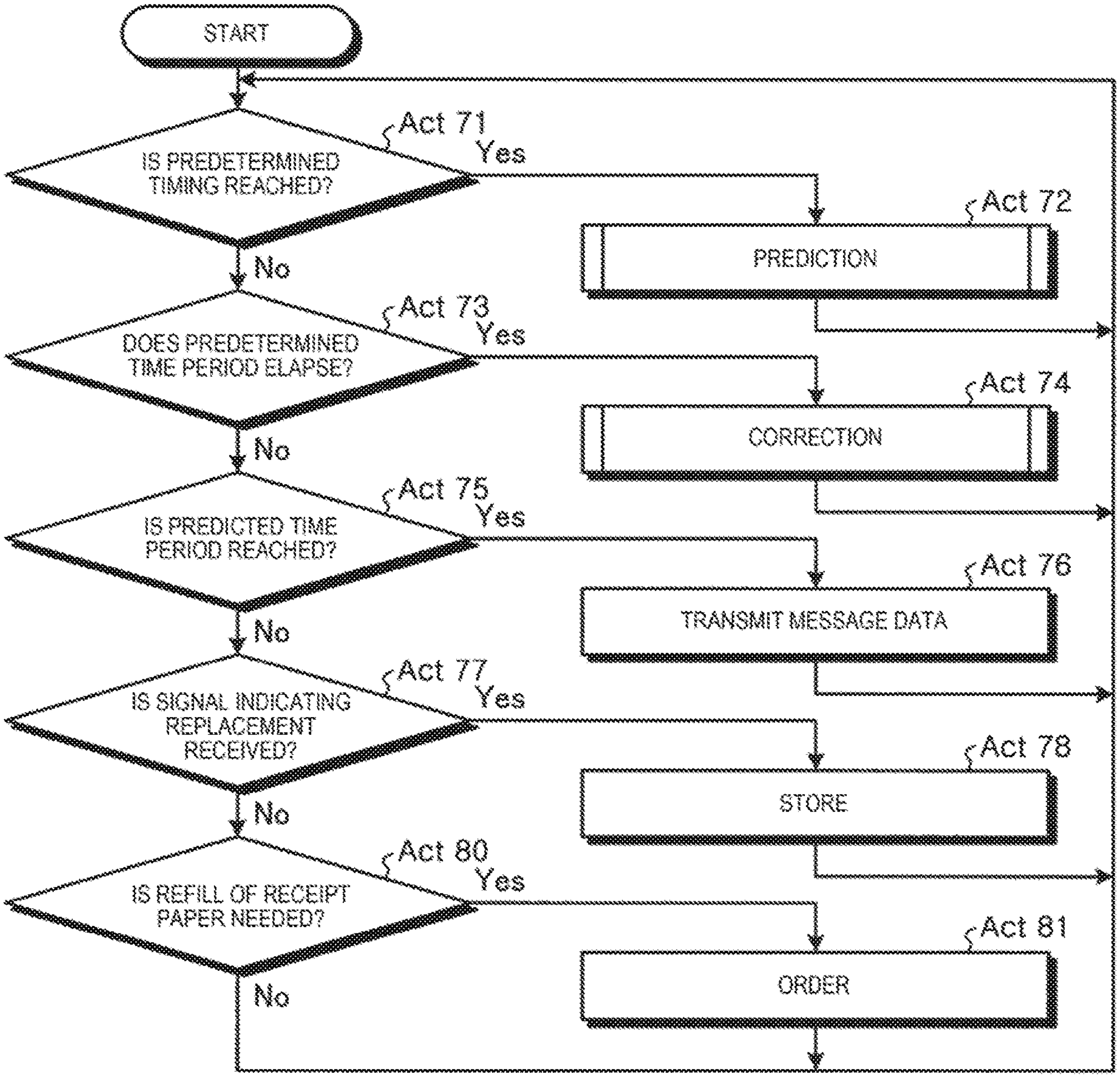
FIG. 12 is a flowchart illustrating a flow of processing performed by the server.
Figure 13:
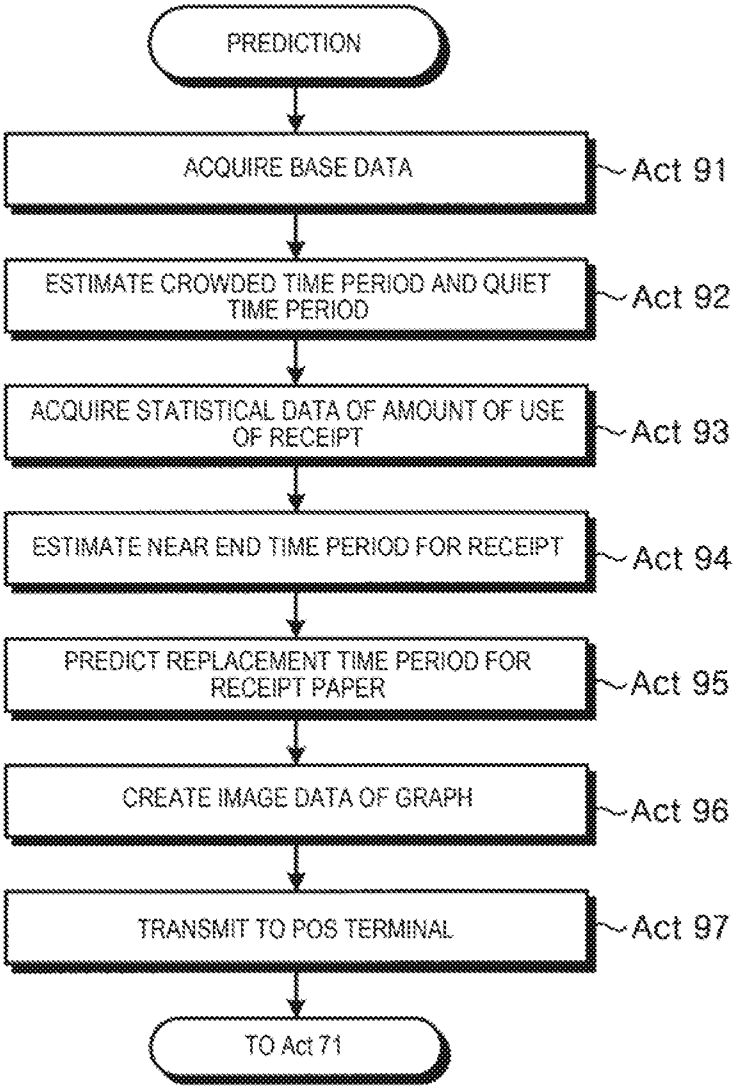
FIG. 13 is a flowchart illustrating a flow of prediction processing performed by the server.
Figure 14:
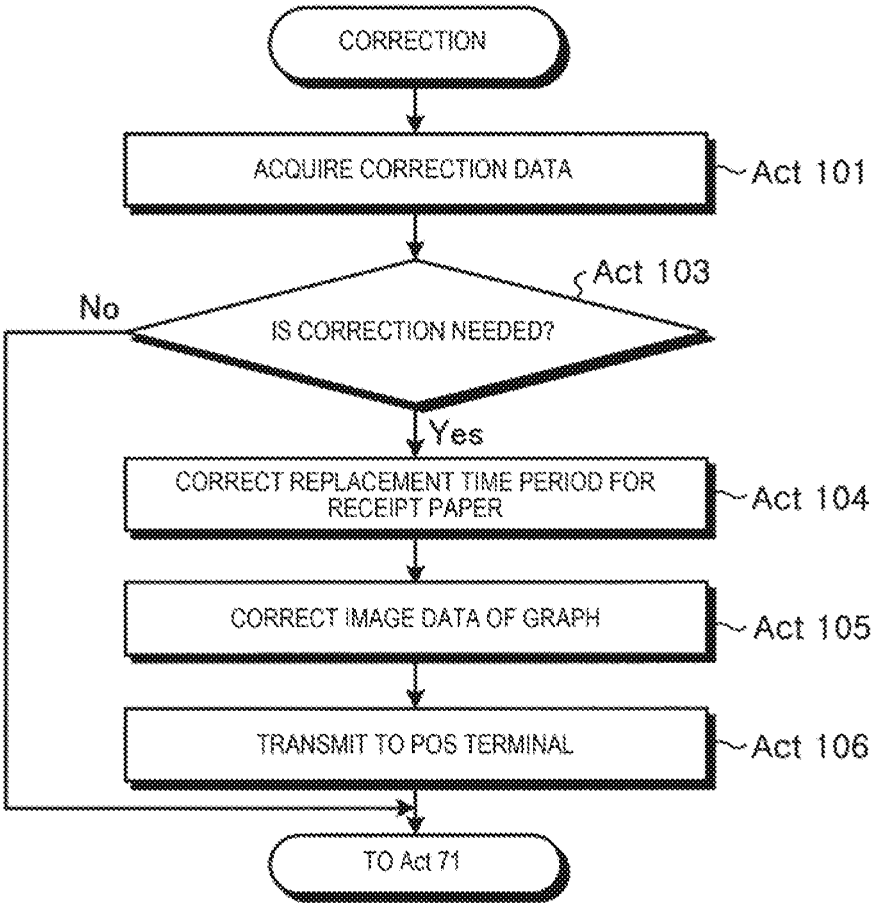
FIG. 14 is a flowchart illustrating a flow of correction processing performed by the server.

Hereinafter, a processing performed by the server 1 for predicting the replacement time period for replacing the receipt paper stored in the POS terminal 3 will be described using FIG. 12 to FIG. 14. In FIG. 12 to FIG. 14, descriptions of parts corresponding to the description of FIG. 7 to FIG. 9 will not be repeated or will be simplified. The printing device 40 which is the receipt issuing device is indirectly connected to the server 1. FIG. 12 is a flowchart illustrating the flow of processing performed by the server 1 for predicting the replacement time period for replacing the receipt paper. As illustrated in FIG. 12, the control unit 100 determines whether or not a predetermined timing is reached (Act 71). The predetermined timing in Act 71 is, for example, a time slightly before the opening of the store T. At this timing, the replacement time period for replacing the receipt paper is predicted. If the control unit 100 determines that the predetermined timing is reached (Yes in Act 71), the control unit 100 executes prediction (Act 72). The control unit 100 returns to Act 71.

FIG. 13 is a flowchart illustrating the prediction processing by the control unit 100 in Act 72. In FIG. 13, the control unit 100 processes Act 91 and Act 92. Since these processes are the same as Act 31 and Act 32, such descriptions will not be repeated. Next, the control unit 100 acquires the statistical information related to the amount of use of the receipt paper from the used receipt amount statistics section 1433 based on the year, the month, the date, and the day of the week of the current day, the presence of a special sale, the presence of an event, the meteorological information, and the like (Act 93). The control unit 100 finds the amount of use of the receipt paper from the acquired information. The control unit 100 estimates the near end time period for the receipt paper based on the found amount of use of the receipt paper (Act 94). The control unit 100 (replacement prediction unit 104) predicts the replacement time period for replacing the receipt paper based on the estimated quiet time period and the estimated near end time period (Act 95).

Next, the control unit 100 creates image data of a graph that visualizes information related to the estimated number of customers and the predicted replacement time period for replacing the receipt paper (Act 96). The control unit 100 (second output unit 105) transmits the created image data of the graph to the POS terminal 3 (Act 97).

Returning to FIG. 12 again, if the control unit 100 in Act 71 determines that the predetermined timing is not reached (No in Act 71), the control unit 100 determines whether or not a predetermined time period (for example, one hour) elapses from the predetermined timing in Act 71 (or the opening time of the store) (Act 73). If the control unit 100 determines that the predetermined time period elapses (Yes in Act 73), the control unit 100 executes correction (Act 74). The control unit 100 returns to Act 71.

FIG. 14 is a flowchart illustrating the correction processed by the control unit 100 in Act 74. In FIG. 14, the control unit 100 acquires correction data (Act 101). The correction data is information related to the actual amount of use of the receipt paper stored in the receipt management unit 145. Next, the control unit 100 compares the statistical amount of use of the receipt paper with the actual amount of use of the receipt paper stored in the receipt management unit 145. The control unit 100 determines whether or not the replacement time period needs to be corrected based on the result of comparison (Act 103). If there is no difference between the statistical amount of use of the receipt paper and the actual amount of use of the receipt paper stored in the receipt management unit 145, the control unit 100 determines that the replacement time period for the receipt paper does not need to be corrected. If there is a difference between the statistical amount of use of the receipt paper and the actual amount of use of the receipt paper stored in the receipt management unit 145, the control unit 100 determines that the replacement time period for the receipt paper needs to be corrected.

If the control unit 100 determines that the replacement time period for the receipt paper needs to be corrected (Yes in Act 103), the control unit 100 estimates the near end time period for the receipt paper again based on the difference. The control unit 100 (second correction unit 106) corrects the replacement time period predicted in Act 95 based on the near end time period estimated again and information related to the number of visiting customers (Act 104).

Next, the control unit 100 corrects the image data of the graph created in Act 96 based on the corrected replacement time period (Act 105). The control unit 100 transmits the corrected image data of the graph to the POS terminal 3 (Act 106). If the control unit 100 determines that the replacement time period does not need to be corrected (No in Act 103), the control unit 100 returns to Act 71 without processing Act 104 to Act 106.

Returning to FIG. 12 again, if the control unit 100 in Act 73 determines that the predetermined time period does not elapse (No in Act 73), the control unit 100 determines whether or not the predicted time period for replacement of the receipt paper predicted in Act 95 or the predicted time period corrected in Act 104 is reached (Act 75). If the control unit 100 determines that the predicted time period is reached (Yes in Act 75), the control unit 100 transmits message data representing a message to the POS terminal 3 (Act 76). In this case, the control unit 100 transmits message data indicating a message that prompts replacement of the receipt paper. The control unit 100 returns to Act 71.

If the control unit 100 determines that the predicted time period for replacement of the receipt paper is not reached (No in Act 75), the control unit 100 determines whether or not a signal indicating that the receipt paper is replaced is received from the POS terminal 3 (Act 77). If the control unit 100 determines that the signal is received (Yes in Act 77), the control unit 100 stores the fact that the receipt paper is replaced in the RAM 13 (Act 78). The RAM 13 cumulatively stores the number of times the receipt paper is replaced. The control unit 100 returns to Act 71.

If the control unit 100 determines that the signal indicating that the receipt paper is replaced is not received (No in Act 77), the control unit 100 determines whether or not the number of sheets or rolls of the receipt paper stored in the store T is less than a predetermined number, and refill of the receipt paper is needed (Act 80). If the control unit 100 determines that refill of the receipt paper is needed (Yes in Act 80), the control unit 100 orders receipt paper from a supplier (Act 81). The control unit 100 returns to Act 71. If the control unit 100 determines that refill of the receipt paper is not needed (No in Act 80), the control unit 100 returns to Act 71.

Figure 15:
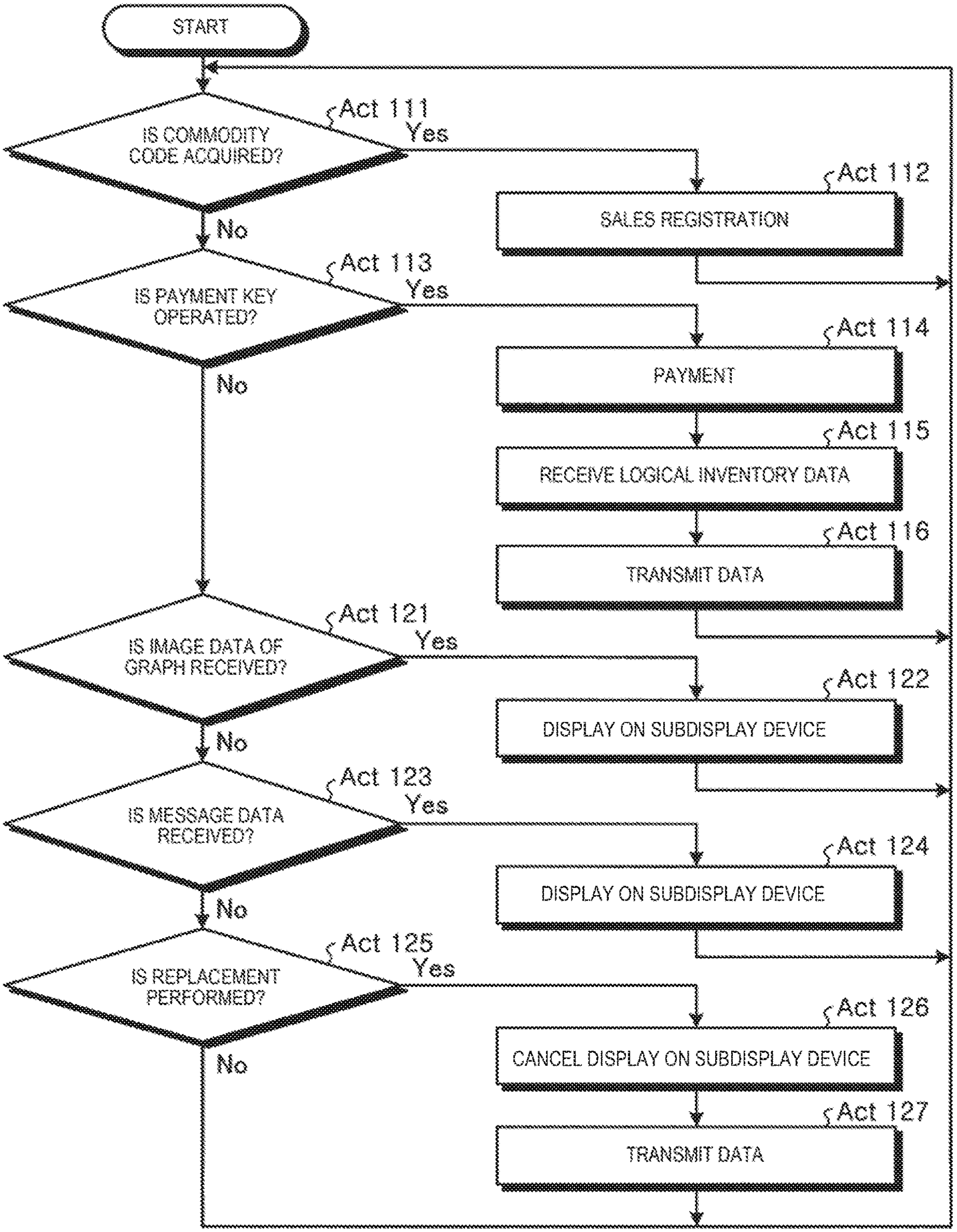
FIG. 15 is a flowchart illustrating a flow of processing performed by the POS terminal.

Next, control of the POS terminal 3 will be described. FIG. 15 is a flowchart illustrating the processing performed by the POS terminal. In FIG. 15, descriptions of parts corresponding to the description of FIG. 10 will not be repeated or will be simplified. In FIG. 15, the control unit 300 processes Act 111 to Act 114. Since Act 111 to Act 114 are the same as Act 51 to Act 54, such descriptions will not be repeated. Next, the control unit 300 acquires the amount of receipt paper issued (Act 115). For example, if payment is made in cash, one sheet of the receipt paper is issued. If payment is made by credit card, two sheets of the receipt paper, including one sheet to be given to the customer and one store copy, are issued. The amount of receipt paper issued may be increased by issuing coupons using the receipt paper. Next, the control unit 300 transmits the commodity information and the payment information related to the payment, and data of the amount of receipt paper issued to the server 1 (Act 116). The control unit 300 returns to Act 111.

While a detailed description is not provided, the amount of receipt paper issued is acquired as needed if the receipt paper is issued at a time other than a transaction with a customer such as issuing an inspection or settlement report.

If the control unit 300 in Act 113 determines that the payment key 371 is not operated (No in Act 113), the control unit 300 processes Act 121 to Act 124. Since Act 121 to Act 124 are the same as Act 61 to Act 64, such descriptions will not be repeated.

If the control unit 300 in Act 123 determines that the message data is not received (No in Act 123), the control unit 300 determines whether or not the receipt paper is replaced from the POS terminal 3 (Act 125). If the control unit 300 determines that the receipt paper is replaced (Yes in Act 125), the control unit 300 removes the message that is displayed in the lower part G6 of the graph image G and prompts replacement of the receipt paper (Act 126). The control unit 300 transmits a signal indicating the fact that the receipt paper is replaced to the server 1 (Act 127). The control unit 300 returns to Act 111. If the control unit 300 determines that the receipt paper is not replaced (No in Act 125), the control unit 300 returns to Act 111.

In the description of the embodiment, the server 1 predicts the refill time period for refilling money, the collection time period for collecting money, and the replacement time period for replacing the receipt paper for one connected POS terminal 3 for simplification of description. However, in actuality, the server 1 executes the same prediction for the plurality of connected POS terminals 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the embodiment, the crowded time period and the quiet time period are estimated based on the number of customers visiting the store. Instead, the crowded time period and the quiet time period may be estimated using the number of deployed POS terminals 3 and the number of customers visiting the store.

In the embodiment, the refill time period and the collection time period are predicted based on the base data and the actual number of pieces of money stored in the automatic change machine 5, which is stored in the change management unit 144. Instead, for example, the refill time period and the collection time period may be predicted based on the ratio of payment in cash to the number of payments. The ratio of payment in cash to the number of payments tends to be proportional to the number of pieces of money stored in the automatic change machine 5. For example, if the ratio of payment in cash is higher than statistical data, the number of pieces of money stored in the automatic change machine 5 tends to be increased. Thus, if the ratio of payment in cash is high, the refill time period for money is corrected to be slightly sooner.

In the embodiment, the process of refill or collection of money and the process of replacement of the receipt paper are described using different flowcharts. Instead, the process of refill or collection of money may be performed at the same time as the process of replacement of the receipt paper.

In the embodiment, the server 1 is described as one example of the prediction and management apparatus. Alternatively, the POS terminal 3 may be the prediction and management apparatus. In this case, the first output unit and the second output unit output information to the subdisplay device 44 in a reportable manner. In a self-checkout POS terminal where customers perform the sales registration and the payment, the first output unit and the second output unit controlled by the POS terminal may output information to an attendant PC and the like managing the self-checkout POS terminal in a reportable manner. If the POS terminal 3 is the prediction and management apparatus, the automatic change machine 5 and the printing device 40 are directly connected to the POS terminal 3. Even if the receipt issuing device is a printing device that is electrically connected to the POS terminal 3, the printing device is directly connected to the POS terminal 3.

In the embodiment, the server 1 creates the image data of the graph that visualizes the predicted refill time period, the predicted collection time period, and the predicted replacement time period, and transmits the image data of the graph to the POS terminal 3. Alternatively, the refill time period and the collection time period for money and the replacement time period for the receipt paper may be transmitted to the POS terminal 3 using a method other than the image of the graph.

In the embodiment, the first output unit 102 has a function of outputting information related to at least one of the predicted collection time period for collecting money or the predicted refill time period for refilling money to the POS terminal 3 in a displayable manner, and the second output unit 105 has a function of outputting information related to the predicted replacement time period for replacing the receipt paper to the POS terminal 3 in a displayable manner. However, one output unit that provides output to the POS terminal 3 from the server 1 may have the function of outputting information related to at least one of the predicted collection time period for collecting money or the predicted refill time period for refilling money to the POS terminal 3 in a displayable manner, and the function of outputting information related to the predicted replacement time period for replacing the receipt paper to the POS terminal 3 in a displayable manner. In this case, this one output unit functions as the first output unit 102 and also functions as the second output unit 105.

The program executed in the server 1 of the embodiment is provided as a recording of an installable or executable file on a computer-readable recording medium such as a CD-ROM, a flexible disk (FD), a CD-R, or a digital versatile disk (DVD).

The program executed in the server 1 of the embodiment may be configured to be stored in a computer that is connected to a network such as the Internet, and provided as a download through the network. The program executed in the server 1 of the embodiment may be configured to be provided or distributed through a network such as the Internet.

The program executed in the server 1 of the embodiment may be configured to be provided by embedding the program in a ROM or the like.

What is claimed is:

1. An automatic change machine management apparatus comprising:

an interface for communicating with an automatic change machine in a store, the automatic change machine configured to receive money and provide withdrawal of money;

a storage device which stores first statistical information indicating a number of customers in the store during past time periods, and second statistical information indicating an amount of money stored in the automatic change machine during past time periods; and a processor programmed to perform a prediction processing including:

predicting, based on the first statistical information and the second statistical information, at least one of an appropriate collection time period during a current day for collecting money from the automatic change machine and an appropriate refill time period for refilling money in the automatic change machine, and outputting information for displaying an image indicating the at least one of the predicted collection time period and the predicted refill time period.

2. The apparatus according to claim 1, wherein the processor is further programmed to perform a correction processing including:

receiving, via the interface, correction data indicating an actual amount of money stored in the automatic change machine, determining, based on the received correction data whether the at least one of the predicted collection time period and the predicted refill time period needs to be corrected, if the at least one of the predicted collection time period and the predicted refill time period needs to be corrected, correcting the at least one of the predicted collection time period and the predicted refill time period to be sooner or later, and outputting information for displaying a corrected message indicating the corrected at least one of the predicted collection time period and the predicted refill time period.

3. The apparatus according to claim 1, wherein the prediction processing performed by the processor further includes:

determining whether a current time corresponds to the at least one of the predicted collection time period and the predicted refill time period, and if the current time corresponds to the at least one of the predicted collection time period and the predicted refill time period, outputting information for displaying a message indicating that money in the automatic change machine needs to be collected or refilled.

4. The apparatus according to claim 1, wherein the image indicating the at least one of the predicted collection time period and the predicted refill time period also indicates the number of customers in the store during past time periods corresponding to the current day.

5. The apparatus according to claim 1, wherein the first statistical information indicates a number of transactions during past time periods.

6. The apparatus according to claim 5, wherein the first statistical information indicates the number of transactions during the past time periods for:

each day of the week, each of a plurality of weather types, and each of a plurality of promotion events.

7. The apparatus according to claim 6, wherein the predicting is further based on the first statistical information compared to:

a current day of the week, a current weather type received from a weather forecasting server, and whether a promotion event is scheduled for the current day.

8. A method for managing an automatic change machine configured to receive money and provide withdrawal of money, the method comprising:

storing first statistical information indicating a number of customers in the store during past time periods, and second statistical information indicating an amount of money stored in the automatic change machine during past time periods;

predicting, based on the first statistical information and the second statistical information, at least one of an appropriate collection time period during a current day for collecting money from the automatic change machine and an appropriate refill time period for refilling money in the automatic change machine; and outputting information for displaying an image indicating the at least one of the predicted collection time period and the predicted refill time period.

9. The method according to claim 8, further comprising:

receiving correction data indicating an actual amount of money stored in the automatic change machine;

determining, based on the received correction data whether the at least one of the predicted collection time period and the predicted refill time period needs to be corrected;

if the at least one of the predicted collection time period and the predicted refill time period needs to be corrected, correcting the at least one of the predicted collection time period and the predicted refill time period to be sooner or later; and outputting information for displaying a corrected message indicating the corrected at least one of the predicted collection time period and the predicted refill time period.

10. The method according to claim 8, further comprising:

determining whether a current time corresponds to the at least one of the predicted collection time period and the predicted refill time period; and if the current time corresponds to the at least one of the predicted collection time period and the predicted refill time period, outputting information for displaying a message indicating that money in the automatic change machine needs to be collected or refilled.

11. The method according to claim 8, wherein the image indicating the at least one of the predicted collection time period and the predicted refill time period also indicates the number of customers in the store during past time periods corresponding to the current day.

12. The method according to claim 8, wherein the first statistical information indicates a number of transactions during past time periods.

13. The method according to claim 12, wherein the first statistical information indicates the number of transactions during the past time periods for:

each day of the week, each of a plurality of weather types, and each of a plurality of promotion events.

14. The method according to claim 13, wherein the predicting is further based on the first statistical information compared to:

a current day of the week, a current weather type received from a weather forecasting server, and whether a promotion event is scheduled for the current day.

* * * * *